United States Patent
Sarrigeorgidis

(10) Patent No.: US 10,327,221 B1
(45) Date of Patent: Jun. 18, 2019

(54) SUPER-RESOLUTION TECHNIQUE FOR TIME-OF-ARRIVAL ESTIMATION

(71) Applicant: Apple Inc., Cupertino, CA (US)

(72) Inventor: Konstantinos Sarrigeorgidis, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/989,266

(22) Filed: May 25, 2018

(51) Int. Cl.
*H04W 64/00* (2009.01)
*H04B 1/7073* (2011.01)
*G01S 11/08* (2006.01)
*H04W 56/00* (2009.01)
*G01S 11/04* (2006.01)

(52) U.S. Cl.
CPC ........... *H04W 64/006* (2013.01); *G01S 11/08* (2013.01); *H04B 1/7073* (2013.01); *H04W 56/006* (2013.01); *G01S 11/04* (2013.01); *H04B 2201/7073* (2013.01)

(58) Field of Classification Search
CPC .. G01S 11/00; G01S 5/0226; G01S 2205/008; G01S 3/043; G01S 3/48; G01S 5/02; H04W 84/12; H04W 64/003; H04W 88/02; H04W 64/00; H04B 17/336; H04L 27/2647
USPC ........................................................ 375/149
See application file for complete search history.

(56) References Cited

U.S. PATENT DOCUMENTS

| | | | | |
|---|---|---|---|---|
| 5,748,507 A | * | 5/1998 | Abatzoglou | G01R 23/167 341/131 |
| 6,208,297 B1 | * | 3/2001 | Fattouche | G01S 5/0009 342/450 |
| 8,208,587 B2 | | 6/2012 | Chong | |
| 2005/0163257 A1 | * | 7/2005 | Keerthi | H04L 25/0248 375/340 |
| 2005/0282568 A1 | * | 12/2005 | Keerthi | H04L 7/041 455/502 |
| 2016/0306027 A1 | * | 10/2016 | Chrabieh | G01S 5/0215 |
| 2016/0381504 A1 | * | 12/2016 | Sommer | H04W 4/80 455/456.1 |
| 2017/0280294 A1 | | 9/2017 | Sommer | |

(Continued)

FOREIGN PATENT DOCUMENTS

EP  3 316 534 A1  5/2018

*Primary Examiner* — Leila Malek
(74) *Attorney, Agent, or Firm* — Meyertons Hood Kivlin Kowert and Goetzel PC

(57) ABSTRACT

An interface circuit in an electronic device may receive samples of wireless signals in one or more time intervals, where the wireless signals are associated with the second electronic device. For example, the samples of the wireless signals may include one or more of: time samples, spatial samples and/or frequency samples. Then, the interface circuit may split the samples of the wireless signals into parallel channels for sub-band processing that improves a resolution and/or a signal-to-noise ratio of the samples of the wireless signals. The sub-band processing may include filtering and decimation. Moreover, the sub-band processing may include a super-resolution technique, such as a multiple signal classification (MUSIC) technique and/or a linear-prediction super-resolution technique. Next, the interface circuit may combine outputs from the parallel channels to estimate a time of arrival of the wireless signals and/or a distance between the electronic device and the second electronic device.

20 Claims, 13 Drawing Sheets

(56) References Cited

U.S. PATENT DOCUMENTS

2018/0024224 A1  1/2018  Seller
2018/0115439 A1  4/2018  Bhatti

* cited by examiner

SUPER-RESOLUTION TECHNIQUE FOR TIME-OF-ARRIVAL ESTIMATION

FIELD

The described embodiments relate, generally, to wireless communications among electronic devices, and techniques for selecting a time of arrival of wireless signals during the wireless communication.

BACKGROUND

Multipath signals in a wireless environment can result in interference and degraded communication performance. In principle, based on received wireless signals as a function of time and space (in communications systems with spatial diversity), wireless-communication parameters such as the time of arrival can be estimated. For example, a superposition of wireless signals having different delays in the time domain results in a summation of exponentials in the frequency domain. Consequently, for well-separated frequencies, Fourier techniques can be used to estimate the minimum time of arrival, and thus to identify the wireless signals associated with line-of-sight communication.

In many applications, the frequency or tone separations are close to the Fourier resolution. This often requires the use of so-called 'high-resolution techniques' to identify the wireless signals associated with line-of-sight communication. For example, a covariance matrix based on the wireless signals can be used to deconvolve the wireless signals in a multipath wireless environment, and thus to identify the wireless signals associated with line-of-sight communication.

However, it can be difficult to determine the covariance matrix. Notably, there is often insufficient data available to uniquely determine the covariance matrix. For example, in order to determine the covariance matrix uniquely, multiple instances or repetitions of the wireless signals may need to be acquired. In time-sensitive applications, such repeated measurements are unavailable. Consequently, the determination of the covariance matrix may be underdetermined, which can complicate and confound attempts at identifying the wireless signals associated with line-of-sight communication. In turn, the resulting errors may degrade the communication performance, which is frustrating for users.

In principle, sub-band or super-resolution techniques can be used to estimate the minimum time-of-arrival of wireless signals. However, in practice it may be difficult to use many sub-band or super-resolutions techniques when there are a large number of multipath signals. Notably, the large number of multipath signals may constrain matrix operations that are used in sub-band or super-resolutions techniques, such as eigenvalue decomposition. For example, the computation requirements for eigenvalue decomposition may scale as the cube of the number of dimensions, such as the number of time, frequency and/or spatial samples. Consequently, it may be computationally impractical to use many sub-band or super-resolution techniques to determine the minimum time-of-arrival of wireless signals.

SUMMARY

A first group of embodiments relates to an electronic device that estimates a time of arrival is described. This electronic device may include multiple nodes that can be communicatively coupled to multiple antennas, and interface circuit that is communicatively couple to multiple nodes and that communicates with the second electronic device. During operation, the interface circuit may receive samples of wireless signals in a time interval, where the wireless signals are associated with the second electronic device and the wireless signals have a fixed bandwidth. Then, the interface circuit may split the samples of the wireless signals into parallel channels for sub-band processing that improves a resolution of the samples of the wireless signals. The sub-band processing may include filtering and decimation. Moreover, the sub-band processing may include a super-resolution technique. Next, the interface circuit combines and analyzes outputs from the parallel channels to estimate the time of arrival.

Note that the samples of the wireless signals may include single instances of one or more multipath signals associated with a number of paths in a wireless environment of the electronic device.

Moreover, the sub-band processing may increase a signal-to-noise ratio of the samples of the wireless signals.

Furthermore, the interface circuit may determine a distance between the electronic device and the second electronic device based at least in part on the samples of the wireless signals and the estimated time of arrival.

Additionally, the super-resolution technique may include a multiple signal classification (MUSIC) technique and/or a linear-prediction super-resolution technique.

In some embodiments, the samples of the wireless signals include one or more of: time samples, spatial samples or frequency samples.

Note that the communication with the second electronic device may involve ultra-wide-band communication.

Other embodiments provide the electronic device that determines the distance, either separately or in addition to the estimated time of arrival.

Still other embodiments provide the interface circuit in the electronic device.

Still other embodiments provide a computer-readable storage medium for use with the interface circuit in the electronic device. When executed by the interface circuit, the computer-readable storage medium may cause the electronic device to perform at least some of the aforementioned operations of the interface circuit in the electronic device.

Still other embodiments provide a method for estimating a time of arrival. The method includes at least some of the aforementioned operations performed by the interface circuit in the electronic device.

A second group of embodiments relates to an electronic device that estimates a time of arrival is described. This electronic device may include a node that can be communicatively coupled to an antenna, and interface circuit that is communicatively couple to node and that communicates with the second electronic device. During operation, the interface circuit may receive samples of wireless signals in multiple instances of a time interval, where the wireless signals are associated with the second electronic device and the wireless signals have a fixed bandwidth. Then, the interface circuit may split the samples of the wireless signals into parallel channels for sub-band processing that improves a resolution of the samples of the wireless signals. The sub-band processing may include filtering and decimation. Moreover, the sub-band processing may include a super-resolution technique. Next, the interface circuit combines and analyzes outputs from the parallel channels to estimate the time of arrival.

Note that the samples of the wireless signals in a given instance of the time interval may include single instances of one or more multipath signals associated with a number of paths in a wireless environment of the electronic device.

Moreover, the sub-band processing may increase a signal-to-noise ratio of the samples of the wireless signals.

Furthermore, the interface circuit may determine a distance between the electronic device and the second electronic device based at least in part on the samples of the wireless signals and the estimated time of arrival.

Additionally, the super-resolution technique may include a MUSIC technique and/or a linear-prediction super-resolution technique.

In some embodiments, the samples of the wireless signals include one or more of: time samples or frequency samples.

Note that the communication with the second electronic device may involve ultra-wide-band communication.

Other embodiments provide the electronic device that determines the distance, either separately or in addition to the estimated time of arrival.

Still other embodiments provide the interface circuit in the electronic device.

Still other embodiments provide a computer-readable storage medium for use with the interface circuit in the electronic device. When executed by the interface circuit, the computer-readable storage medium may cause the electronic device to perform at least some of the aforementioned operations of the interface circuit in the electronic device.

Still other embodiments provide a method for estimating a time of arrival. The method includes at least some of the aforementioned operations performed by the interface circuit in the electronic device.

This Summary is provided for purposes of illustrating some exemplary embodiments, so as to provide a basic understanding of some aspects of the subject matter described herein. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing communication between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

Note that like reference numerals refer to corresponding parts throughout the drawings. Moreover, multiple instances of the same part are designated by a common prefix separated from an instance number by a dash.

DETAILED DESCRIPTION

Figure 1:
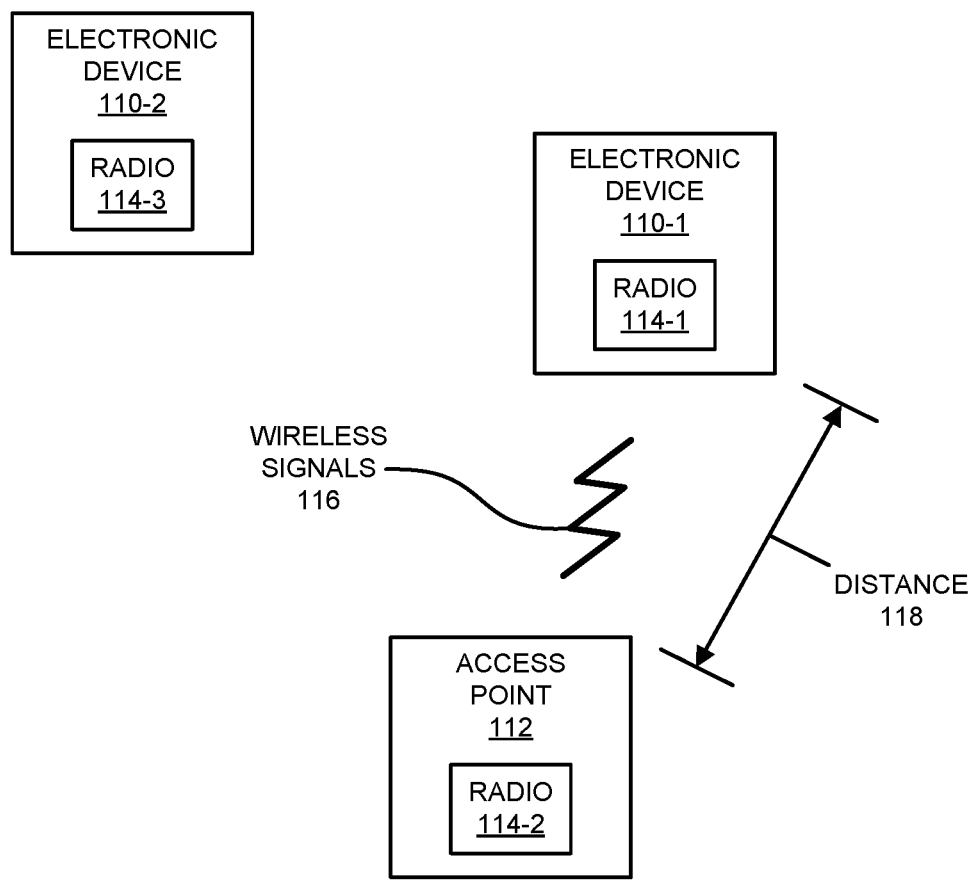
FIG. 1 is a block diagram illustrating an example of electronic devices communicating wirelessly.

An interface circuit in an electronic device may receive samples of wireless signals in one or more time intervals, where the wireless signals are associated with the second electronic device and the wireless signals have a fixed bandwidth. For example, the samples of the wireless signals may include one or more of: time samples, spatial samples and/or frequency samples. Then, the interface circuit may split the samples of the wireless signals into parallel channels for sub-band processing that improves a resolution and/or a signal-to-noise ratio of the samples of the wireless signals. The sub-band processing may include filtering and decimation. Moreover, the sub-band processing may include a super-resolution technique, such as a multiple signal classification (MUSIC) technique and/or a linear-prediction super-resolution technique. Next, the interface circuit may combine and analyze outputs from the parallel channels to estimate a time of arrival of the wireless signals and/or a distance between the electronic device and the second electronic device.

By estimating the time of arrival (such as a lower time of arrival) and/or the distance, this communication technique may reduce the impact of multipath signals. For example, the communication technique may allow the electronic device to accurately perform wireless ranging. More generally, the communication technique may improve the communication performance by allowing the electronic device to estimate one or more wireless-communication parameters, such as the time of arrival of the wireless signal, the angle of arrival of the wireless signal, and/or the amplitude of the wireless signal. Consequently, the communication technique may improve the user experience when using the electronic device, and thus may increase customer satisfaction and retention.

Note that the communication technique may be used during wireless communication between electronic devices in accordance with a communication protocol, such as an ultra-wide-band (UWB) protocol or with a wireless ranging technique that has a bandwidth greater than 20 MHz. For example, the communication technique may be used in conjunction with a communication protocol that is compatible with an IEEE 802.11 standard (which is sometimes referred to as Wi-Fi). In some embodiments, the communication technique is used with IEEE 802.11ax, which is used as an illustrative example in the discussion that follows. However, this communication technique may also be used with a wide variety of other communication protocols and/or implementations, and in electronic devices (such as portable electronic devices or mobile devices) that can incorporate multiple different radio access technologies (RATs) to provide connections through different wireless networks that offer different services and/or capabilities.

Notably, an electronic device can include hardware and software to support a wireless personal area network (WPAN) according to a WPAN communication protocol, such as those standardized by the Bluetooth® Special Interest Group (in Kirkland, Wash.) and/or those developed by Apple (in Cupertino, Calif.), e.g., that are referred to as Apple Wireless Direct Link (AWDL). Moreover, the electronic device can communicate via: a wireless wide area network (WWAN), a wireless metro area network (WMAN) a WLAN, near-field communication (NFC), a cellular-telephone or data network (such as using a third generation (3G) communication protocol, a fourth generation (4G) communication protocol, e.g., Long Term Evolution or LTE, LTE Advanced (LTE-A), a fifth generation (5G) communication protocol, or other present or future developed advanced cellular communication protocol) and/or another communication protocol. In some embodiments, the communication protocol includes a peer-to-peer communication technique.

The electronic device, in some embodiments, can also operate as part of a wireless communication system, which can include a set of client devices, which can also be referred to as stations, client electronic devices, or client electronic devices, interconnected to an access point, e.g., as part of a WLAN, and/or to each other, e.g., as part of a WPAN and/or an 'ad hoc' wireless network, such as a Wi-Fi direct connection. In some embodiments, the client device can be any electronic device that is capable of communicating via a WLAN technology, e.g., in accordance with a WLAN communication protocol. Furthermore, in some embodiments, the WLAN technology can include a Wi-Fi (or more generically a WLAN) wireless communication subsystem or radio, and the Wi-Fi radio can implement an IEEE 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; IEEE 802.11ax, or other present or future developed IEEE 802.11 technologies.

In some embodiments, the electronic device can act as a communications hub that provides access to a WLAN and/or to a WWAN and, thus, to a wide variety of services that can be supported by various applications executing on the electronic device. Thus, the electronic device may include an 'access point' that communicates wirelessly with other electronic devices (such as using Wi-Fi), and that provides access to another network (such as the Internet) via IEEE 802.3 (which is sometimes referred to as 'Ethernet').

Additionally, it should be understood that the electronic devices described herein may be configured as multi-mode wireless communication devices that are also capable of communicating via different 3G and/or second generation (2G) RATs. In these scenarios, a multi-mode electronic device or UE can be configured to prefer attachment to LTE networks offering faster data rate throughput, as compared to other 3G legacy networks offering lower data rate throughputs. For example, in some implementations, a multi-mode electronic device is configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

In accordance with various embodiments described herein, the terms 'wireless communication device,' 'electronic device,' 'mobile device,' 'mobile station,' 'wireless station,' 'wireless access point,' 'station,' 'access point' and 'user equipment' (UE) may be used herein to describe one or more consumer electronic devices that may be capable of performing procedures associated with various embodiments of the disclosure.

We now describe embodiments of the communication techniques. FIG. 1 presents a block diagram illustrating an example of electronic devices communicating wirelessly. One or more electronic devices 110 (such as a smartphone, a laptop computer, a notebook computer, a tablet, a wearable, a media device, a smart hub, or another such electronic device) and access point 112 may communicate wirelessly in a WLAN using an IEEE 802.11 communication protocol. Thus, electronic devices 110 may be associated with access point 112. For example, electronic devices 110 and access point 112 may wirelessly communicate while: detecting one another by scanning wireless channels, transmitting and receiving beacons or beacon frames on wireless channels, establishing connections (for example, by transmitting connect requests), and/or transmitting and receiving packets or frames (which may include the request and/or additional information, such as data, as payloads). Note that access point 112 may provide access to a network, such as the Internet, via an Ethernet protocol, and may be a physical access point or a virtual (or 'software') access point that is implemented on a computer or an electronic device.

As described further below with reference to FIG. 13, electronic devices 110 and/or access point 112 may include subsystems, such as any/all of: a networking subsystem, a memory subsystem, and/or a processor subsystem. In addition, electronic devices 110 and/or access point 112 may include radios 114 in, e.g., the networking subsystems. More generally, electronic devices 110 and/or access point 112 can include (or can be included within) any electronic devices with networking subsystems that enable electronic devices 110 and access point 112 to wirelessly communicate with another electronic device. This can include transmitting beacons on wireless channels to enable the electronic devices to make initial contact with or to detect each other, followed by exchanging subsequent data/management frames (such as connect requests) to establish a connection, configure security options (e.g., IPSec), transmit and receive packets or frames via the connection, etc.

As can be seen in FIG. 1, wireless signals 116 (represented by a jagged line) are communicated by radios 114-1 and 114-2 in electronic device 110-1 and access point 112, respectively. For example, as noted previously, electronic device 110-1 and access point 112 may exchange packets using a Wi-Fi communication protocol in a WLAN. Notably, as illustrated further below with reference to FIGS. 2 and 3, radio 114-1 may receive samples of wireless signals 116 in one or more instances of a time interval, where wireless signals 116 are transmitted by radio 114-2. Note that wireless signals 116 may have a fixed bandwidth. For example, the samples of wireless signals 116 may include time samples and/or frequency samples. Separately or additionally, in embodiments where electronic devices 110 include multiple antennas (such as, e.g., at least three antennas), the samples of wireless signals 116 may include spatial samples.

In some embodiments, where the samples of wireless signals 116 are in a single instance of the time interval, the samples of wireless signals 116 may include single instances or snapshots of one or more multipath signals associated with a number of paths in a wireless environment of electronic device 110-1 and access point 112. However, in some embodiments, where the samples of wireless signals 116 are in multiple instances of the time interval, a given instance of the time interval may include single instances of the one or more multipath signals associated with the number of paths in the wireless environment of electronic device 110-1 and access point 112.

Based at least in part on the samples of wireless signals 116, radio 114-1 may split the samples of wireless signals 116 into parallel channels for sub-band processing that improves a resolution and/or a signal-to-noise ratio (SNR) of the samples of wireless signals 116. The sub-band processing may include filtering and decimation. Moreover, the sub-band processing may include a super-resolution technique, such as a multiple signal classification (MUSIC) technique and/or a linear-prediction super-resolution technique.

Then, radio 114-1 may combine and analyze outputs from the parallel channels to estimate a wireless-communication parameter. For example, the wireless-communication parameter may include a time of arrival of wireless signals 116, such as by selecting a lower (e.g., the minimum) time of arrival.

In some embodiments, radio 114-1 may determine a distance 118 between electronic device 110-1 and access point 112 based at least in part on the samples of wireless signals 116 and the estimated time of arrival. More generally, radio 114-1 may determine its distance from another electronic device. For example, a phone can determine its distance from a computer to facilitate unlocking.

In these ways, the communication technique may allow electronic devices 110 and access point 112 to identify wireless signals associated with line-of-sight communication and to accurately determine distance, such as an accuracy of ones, tens, or hundreds of centimeters. These capabilities may improve the user experience when using electronic devices 110. For example, the accurately determined distance may facilitate location-based services and/or other device functions.

Note that access point 112 and at least some of electronic devices 110 may be compatible with an IEEE 802.11 standard that includes trigger-based channel access (such as IEEE 802.11ax). However, access point 112 and at least this subset of electronic devices 110 may also communicate with one or more legacy electronic devices that are not compatible with the IEEE 802.11 standard (i.e., that do not use multi-user trigger-based channel access). In some embodiments, at least a subset of electronic devices 110 use multi-user transmission (such as orthogonal frequency division multiple access or OFDMA).

In the described embodiments, processing a packet or frame in one of electronic devices 110 and access point 112 includes: receiving wireless signals 116 encoding a packet or a frame; decoding/extracting the packet or frame from received wireless signals 116 to acquire the packet or frame; and processing the packet or frame to determine information contained in the packet or frame (such as data in the payload).

In general, the communication via the WLAN in the communication technique may be characterized by a variety of communication-performance metrics. For example, the communication-performance metric may include: a received signal strength (RSS), a data rate, a data rate for successful communication (which is sometimes referred to as a 'throughput'), a latency, an error rate (such as a retry or resend rate), a mean-square error of equalized signals relative to an equalization target, inter-symbol interference, multipath interference, an SNR, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

Although we describe the network environment shown in FIG. 1 as an example, in alternative embodiments, different numbers and/or types of electronic devices may be present. For example, some embodiments may include more or fewer electronic devices. As another example, in other embodiments, different electronic devices can be transmitting and/or receiving packets or frames.

Figure 2:
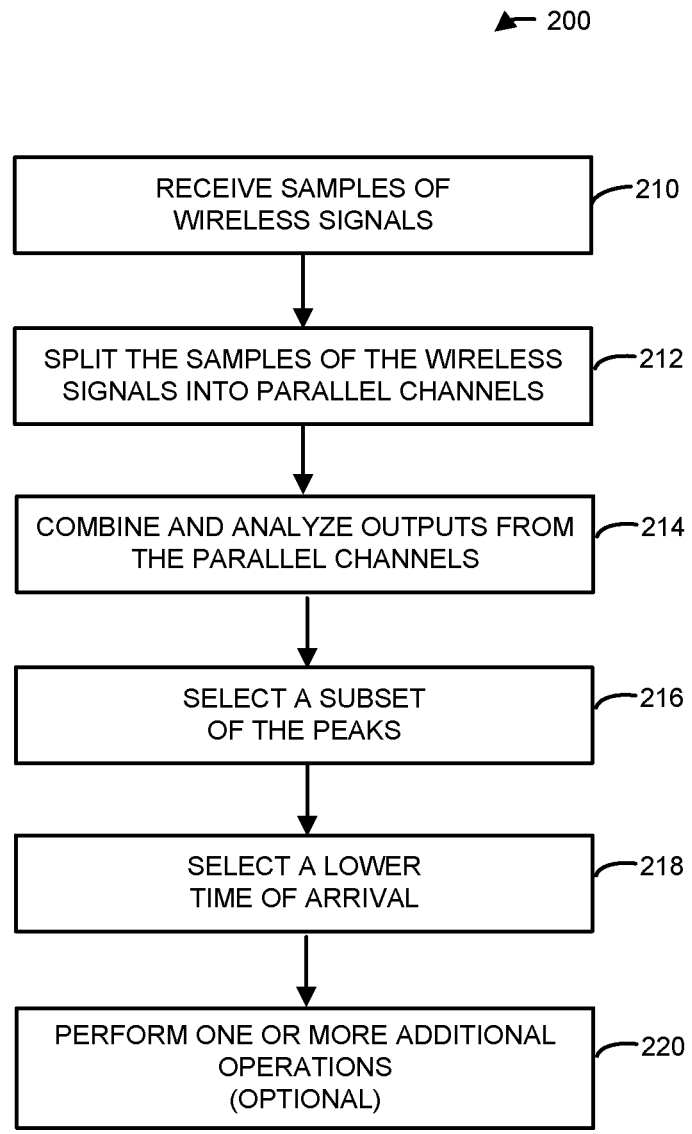
FIG. 2 is a flow diagram illustrating an example method for estimating a wireless-communication parameter during communication between an electronic device and a second electronic device using one of the electronic devices in FIG. 1.

FIG. 2 presents a flow diagram illustrating an example method 200 for wireless-communication parameter during communication between an electronic device and a second electronic device. This method may be performed by an electronic device, such as an interface circuit in electronic device 110-1 in FIG. 1. During operation, the interface circuit may receive samples of wireless signals (operation 210) in one or more instances of a time interval, where the wireless signals are associated with the second electronic device and the wireless signals have a fixed bandwidth. For example, the samples of the wireless signals may include one or more of: time samples, spatial samples and/or frequency samples. Note that the samples in a given time interval may include single instances of one or more multipath signals associated with a number of paths in a wireless environment of the electronic device.

Then, the interface circuit may split the samples of the wireless signals into parallel channels (operation 212) for sub-band processing that improves a resolution and/or an SNR of the samples of the wireless signals. The sub-band processing may include filtering and decimation. Moreover, the sub-band processing may include a super-resolution technique, such as a multiple signal classification (MUSIC) technique and/or a linear-prediction super-resolution technique.

Next, the interface circuit may combine and analyze outputs from the parallel channels (operation 214) to estimate a wireless-communication parameter, such as a time of arrival of the wireless signals and/or a distance between the electronic device and the second electronic device.

Note that the communication with the second electronic device may involve ultra-wide-band communication.

In some embodiments of method 200, there may be additional or fewer operations. Moreover, the order of the operations may be changed, and/or two or more operations may be combined into a single operation.

In some embodiments, at least some of the operations in method 200 is performed by an interface circuit in the electronic device. For example, at least some of the operations may be performed by firmware executed by an interface circuit, such as firmware associated with a MAC layer, as well as one or more circuits in a physical layer in the interface circuit.

Figure 3:
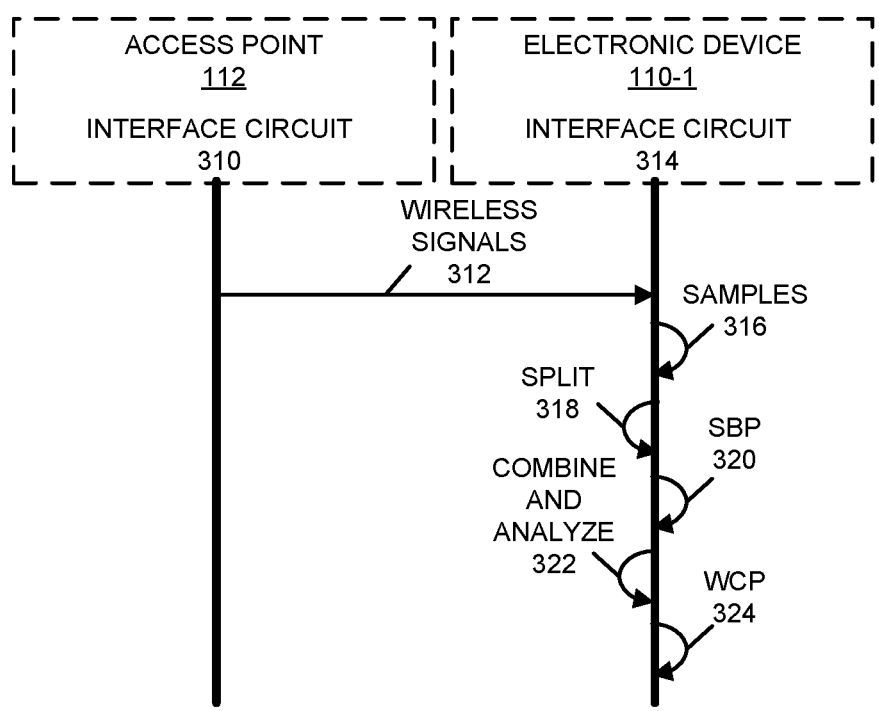
FIG. 3 is a flow diagram illustrating an example of communication between electronic devices, such as the electronic devices of FIG. 1.

The communication technique is further illustrated in FIG. 3, which presents a flow diagram illustrating an example of communication between electronic device 110-1 and access point 112. Notably, interface circuit 310 in access point 112 may transmit wireless signals 312 to electronic device 110-1. Then, interface circuit 314 in electronic device 110-1 may receive samples 316 of wireless signals 312 in one or more instances of a time interval. Note that wireless signals 312 may have a fixed bandwidth.

Then, interface circuit 314 may split 318 the samples of the wireless signals into parallel channels for sub-band processing (SBP) 320 that improves a resolution and/or an SNR of the samples of the wireless signals. This sub-band processing may include filtering and decimation.

Next, interface circuit 314 may combine and analyze 322 outputs from the parallel channels to estimate at least a wireless-communication parameter (WCP) 324, such as a time of arrival of the wireless signals and/or a distance between electronic device 110-1 and access point 112.

Representative Embodiments

We now describe embodiments of the communication technique. This communication technique may perform false-peak mitigation for time-of-arrival estimation. Moreover, the communication technique may improve the accuracy of distance determination using ultra-wide-band communication.

Figure 4:
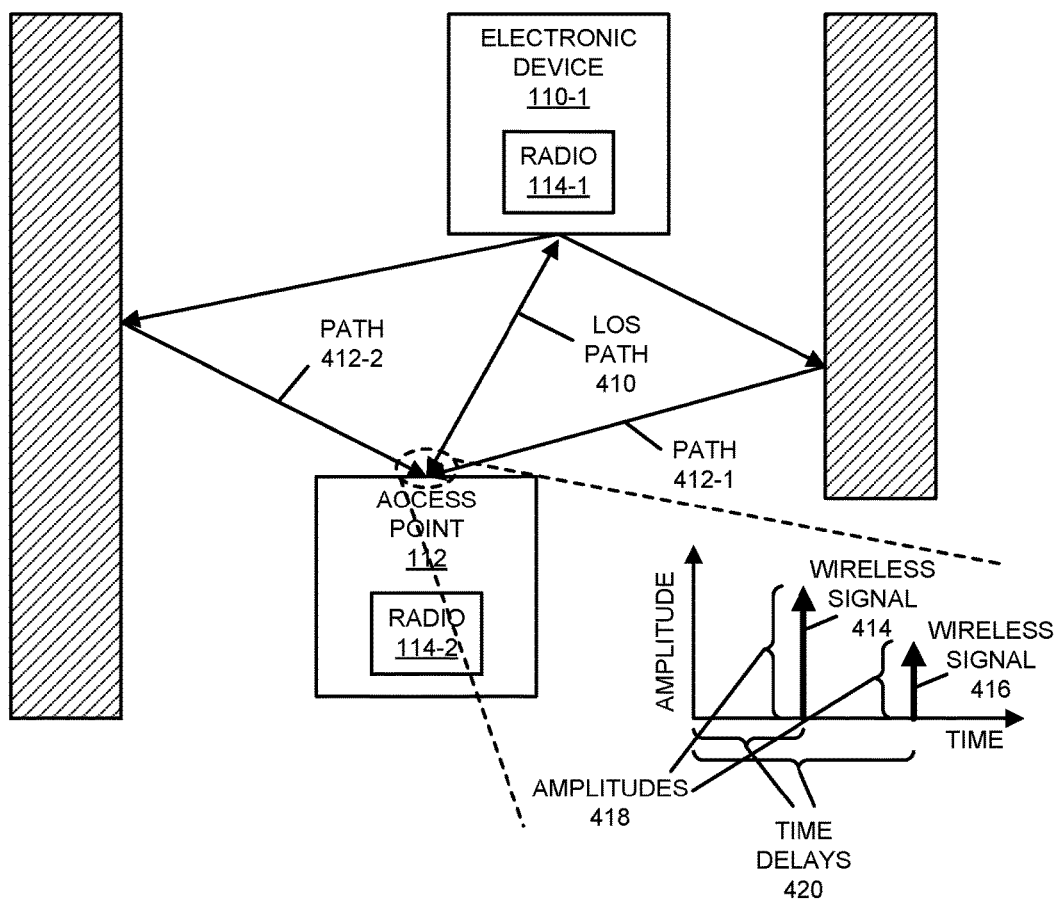
FIGS. 4 and 5 are drawings illustrating example communication between electronic devices, such as the electronic devices of FIG. 1.

FIG. 4 presents a drawing illustrating example communication between electronic devices, such as electronic device 110-1 and access point 112 in FIG. 1. In FIG. 4, there are multiple paths between electronic device 110-1 and access point 112, including a line-of-sight (LOS) path 410 that results in a direct wireless signal 414, and additional paths 412 that give rise to multipath wireless signals (such as wireless signal 416). As shown in the inset, which illustrates the received wireless signals at electronic device 110-1, wireless signals 414 and 416 have associated amplitudes 418 and time delays 420. However, it can be difficult to distinguish or separate wireless signal 414 from wireless signals 416.

Figure 5:
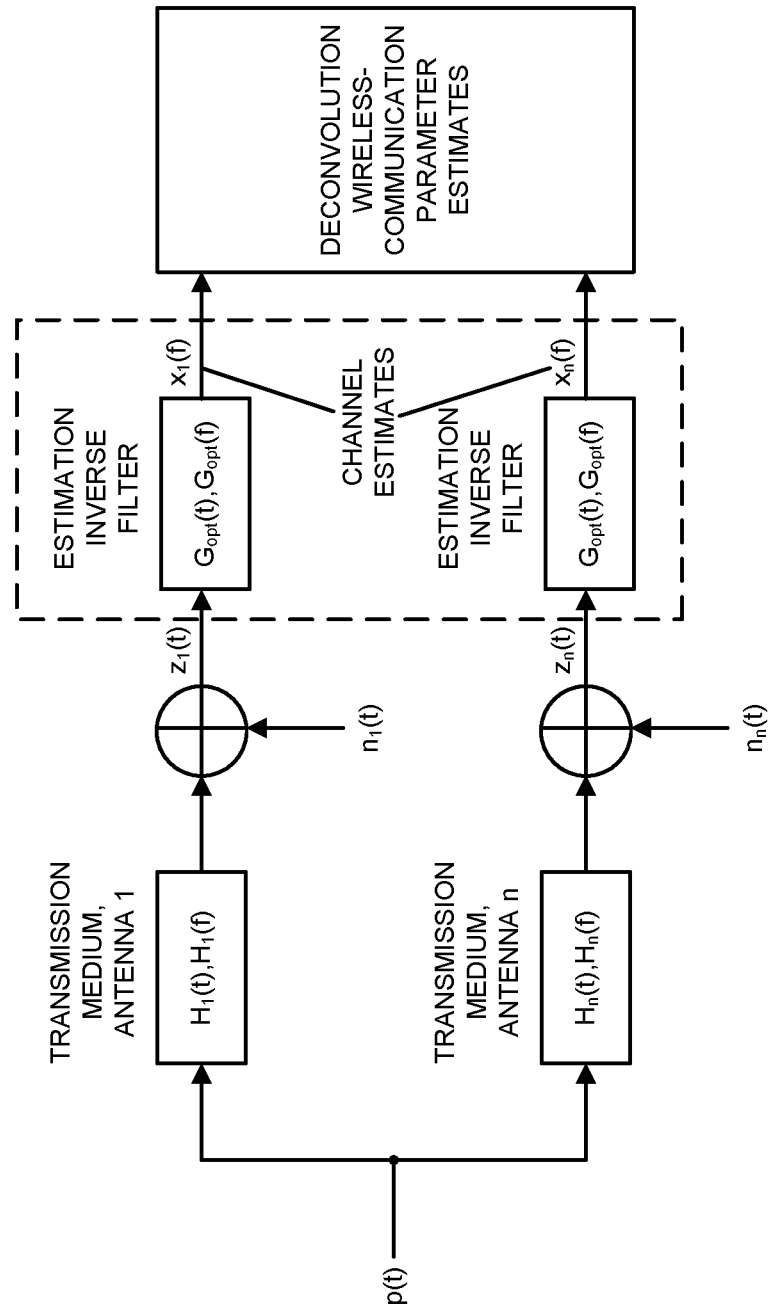

FIG. 5 presents a drawing illustrating example communication between electronic devices, such as electronic device 110-1 and access point 112 in FIG. 1. In FIG. 5, a modulating waveform p(t) is transmitted by N antennas in a transmitting electronic device through paths having channel impulse responses $h_i(t)$ in the time domain (where i is an integer between 1 and N) and $H_i(f)$ in the frequency domain. In addition, additive noise $n_i(t)$ corrupts the transmitted wireless signals.

Samples, $z_i(t)$, of the wireless signals are received by N antennas or sensors in a receiving electronic device. These samples are passed through a set of estimation inverse filters having impulse responses $g_{opt}(t)$ or, equivalently, $G_{opt}(f)$. Then, the resulting channel estimates $x_i(f)$ (which, in principle, include multiple direct and multipath signals) are deconvolved to determine time-of-arrival (TOA) and/or direction-of-arrival (DOA) estimates. Note that the estimation inverse filters may provide minimum mean square error (MMSE)-type estimates of a segment of the aggregate impulse response. In general, for a high SNR of, e.g., 30 dB, inverse filters may be used, while for a low SNR of, e.g., 15 dB, a matched filter may be used. Moreover, as described further below, the deconvolution may employ a high-resolution or super-resolution deconvolution technique to solve for individual path delays, so that the first or lower path delay can be selected.

Thus, given the received wireless signals as a function of time, frequency and/or space (in electronic devices with spatial diversity, e.g., multiple antennas), wireless-communication parameters associated with a first or line-of-sight path may be estimated, such as one or more of: the loss of signal, the time of flight, the DOA, etc.

The communication technique may include two operations. Notably, because the channel transfer function may be unknown, $G_{opt}(f)$ may be designed to provide channel estimates $x_i(f)$ of a segment of the aggregate impulse response. For example, $G_{opt}(f)$ may be the inverse of the pulse shape or the modulating waveform in the frequency domain, P(f), i.e., $$G_{opt}(f) = \frac{1}{P(f)}.$$

Moreover, the superposition of time domain delays associated with different paths results in a summation of exponentials in the frequency domain. For well-separated frequencies, a Fourier technique (such as an FFT or a DFT) allows the wireless signals associated with different paths to be estimated. However, as noted previously, this may be difficult when the tone separation is closely spaced (e.g., when the tone separation is close to Fourier resolution). Therefore, in a second operation, given a channel estimate $x_i(f)$, sub-space fitting to observed data and a high-resolution or a super-resolution deconvolution technique may be used to solve for individual path delays, so that the first or lower path delay can be selected.

Notably, in the sub-space fitting to observed data, assume that there are M paths, N sensors, and an unknown parameter vector $\Theta$. Moreover, assume that there is a signal vector s(t) and an N×M matrix of steering vectors (or signature vectors) $A(\Theta)$. The signature model may be $X(t)=A(\Theta)s(t)+N(t)$, which are the vector samples. Furthermore, the theoretical covariance of the observation may be $R_x(\Theta)=A(\Theta)PA(\Theta)^H + \sigma^2 I$, and note that the theoretical covariance may assume an infinite amount of data $P=E[s(t)s(t)^H]$. The signal covariance matrix may be P. Let $U(\Theta)$ be the theoretical eigenvectors of $R_x(\Theta)$, and let $U_s(\Theta)$ denote the theoretical (from $R_x(\Theta)$) set of M signal eigenvectors. Additionally, let $\hat{U}_s(\Theta)$ be the estimate from the data signal sub-space.

Then, in a super-resolution technique (such as a MUSIC technique), from data X(t) $\hat{U}_s(\Theta)$ may be estimated. Note that $$\hat{P} = \frac{1}{T} \sum_{t=1}^{T} s(t)s(t)^H,$$

where there are T vector samples. Next, find the intersection of $R(\Theta)$ with $\hat{U}_s(\Theta)$:

$$\min_\Theta \min_{c_M} |R_x(\Theta) - \hat{U}_s C_M|^2 = \min_\Theta a^H(\Theta_m) \hat{U}_n \hat{U}_n^H a$$
$(\Theta_m)$, where $a(\Theta_m)$ are steering vectors, $\hat{U}_n$ is a noise sub-space projection, and $\hat{U}_n(\Theta)$ is an empirical noise sub-space from data. Note that this is a one-dimensional search. With the correct assumptions, analysis using the MUSIC technique can achieve maximum likelihood performance.

For maximum-likelihood sub-space fitting to observed data, $$\min_\Theta \min_{c_L} |\hat{U} - \hat{U}_s(\Theta) C_L|\Lambda^2 = \frac{1}{N} \sum_{n=1}^{N} \hat{\lambda}_n \|\hat{u}_n - \hat{U}_s(\Theta) C_n\|^2,$$

where n is a sensor space index, and $\hat{U}_s(\Theta)=[u_1(\Theta) \ldots u_M(\Theta)]$ denote the N×M matrix of signal eigenvectors of $R_x(\Theta)=A(\Theta)PA(\Theta)^H+\sigma^2 I$, whose corresponding eigenvalues are greater than $\sigma^2$. Note that the minimum norm interpretation of the maximum likelihood states that the empirical eigenvectors $\{\hat{u}_n\}$ are linearly fitted by the principal eigenvectors of the theoretical covariance $R_x(\Theta)$. Because an eigenvector of $R_x(\Theta)$ depends on the unknown parameters, $\{\theta_m\}$ may need to be simultaneously estimated in the maximum-likelihood approach. This may involve a multi-dimensional search and high complexity. Consequently, a maximum-likelihood approach may not be practical for M greater than two because of an exponential increase in complexity. In contrast, a MUSIC technique may have less complexity than the maximum-likelihood approach. However, it may still be difficult to implement. Therefore, a MUSIC technique may be difficult to use on a portable electronic device.

Moreover, there may be a variety of challenges in applying sub-space fitting to a multipath (coherent) environment. Assume that the signals, at any instant, are phase-delayed amplitude-weighted replicas of each other: $s_k(t)=\alpha_k s_1(t)$, where $k=2, \ldots M$. In this case, the signal covariance matric is rank one: $P=R_s=\alpha \cdot \alpha^H$, where $\alpha=[\alpha_1, \alpha_2, \ldots \alpha_M]^T$. Then, the covariance of the array output may be $R_x=A \cdot \alpha \alpha^H \cdot A + \sigma^2 I = bb^H + \sigma^2 I$, where $b=A \cdot \alpha$. Because the covariance matrix has rank one, the noise eigenvalues of $R_x$ may satisfy $\lambda_2=\lambda_3=\ldots=\lambda_M=\sigma^2$. Note that the corresponding noise eigenvectors may be denoted at $\beta_i$. Moreover, $\beta_i^H b=0$ may be satisfied (i.e., orthogonality), where $i=2, 3, \ldots M$. Furthermore, because of the Vandermonde structure, no linear combination of steering vectors can in result in another valid steering vector. Therefore, b is not a legitimate steering vector and the preceding equation may not estimate a true delay or angle. Consequently, a MUSIC technique may not be directly applied to coherent sources.

In applying a MUSIC technique for time-of-flight estimation in a coherent multipath, a mathematical model may be expressed in the frequency domain. Notably, assume mat $$G_{opt}(f) = \frac{1}{P(f)},$$

which may be sub-optimal in the presence of noise. The superposition of time domain delays results in a summation of exponentials in the frequency domain, which will form the steering vectors. Moreover, additive noise may corrupt the observation $\eta=\{\tau_1 \ldots \tau_M\}$. For well-separated frequencies, the Fourier technique can provide a simple and optimal solution for the estimation. However, as noted previously, when the tone separation is closely spaced (e.g., close to the Fourier resolution), a high-resolution or a super-resolution technique may be employed. These techniques may be based on the covariance matrix of the data (such as MUSIC, maximum likelihood, etc.).

Let the number of snapshots (independent data) be T, the number of paths be M and the FFT size be N. Then, the model is $X(t)=Y(t)+N(t)=A \cdot s(t)+N(t)$, where $t=1, \ldots, T$, and $A=[a_1, a_2, \ldots a_M]$. Moreover, $a_m=z_m^{-(N-1)/2}[1, z_m, \ldots z_m^{N-1}]^T$, where $z_m=\exp(j\Omega_m)$. Furthermore, $S(t)=[s_1(t), \ldots s_M(t)]^T$. Note that, in the sensor space, $x_n(t)=y_n(t)+n_n(t)$, where $$n = -\frac{N-1}{2}, \ldots, \frac{N-1}{2}.$$

Additionally, $y_n(t)=\Sigma_{m=1}^M s_m(t)\exp(jn\omega_m)$, where $\omega_m=2\pi\tau_m F_s/N$, M is less than N, and n is the frequency domain index. In the general model there may be T snapshots. However, in some embodiments T equals 1.

For the mathematical model in the frequency domain, the data covariance matrix is given by $$R_x(\Theta) = \frac{1}{T}\sum_{t=1}^T X(t)X(t)^H = APA^H + \sigma^2 I.$$

Moreover, the signal covariance matrix is given by $$\hat{P} = \frac{1}{T}\sum_{t=1}^T S(t)S(t)^H.$$

As noted previously, a MUSIC technique may include two operations. In the first operation, the signal sub-space may be estimated. Then, in the second operation, the frequencies may be estimated from the estimated signal sub-space (and noise sub-space). Note that the first operation may rely on the hypothesis that the signal manifold $\{X(t)\}$ spans the whole signal sub-space. In this case, $R_x$ has M nonzero signal eigenvalues. Consequently, the MUSIC technique may need M independent snapshots. Furthermore, if the condition on $\{X(t)\}$ is not specified, the rank of $R_x$ is less than M and some additional condition may have to be used, such as a moving average or smoothing (such can be used to mimic multiple snapshots when determining the covariance matrix, but is often sub-optimal). This is true when T is less than M (e.g., when T=1). Note that the second operation may rely on the orthogonality of any vector E in the noise sub-space to all the signal vectors, e.g., $\forall E \in$ noise sub-space, which implies that $a^H E=0$. Alternatively and equivalently, a discriminating function may be defined as $f_E(\omega)=A(z)^H E$, where $z=\exp(j\omega)$, which implies that a pseudospectrum is given by $$\frac{1}{|fE(\omega)|^2}.$$

When using the MUSIC technique with coherent sources, a forward moving average (for T<M) may be used as a pre-processing operation, at the cost of a reduced aperture. Notably, when the number of snapshots T is less than M, then the signal manifold given by $\{X(t)\}$ may no longer span the signal sub-space. In order to extend the rank of the signal manifold to M, the shift invariant property of the complex exponentials may be used. Consider sub-vectors of length L, formed from a big vector (of length N). The number of such sub-vectors is $K=N-L+1$. These sub-vectors are L adjacent and centered at index k: $X_k(t)=(x_{k-(L-1/2)}(t), \ldots, x_k(t), x_{k+1}(t), \ldots x_{k+(L-1/2)}(t))^T=Y_k(t)+N_k(t)$, where $$-\frac{K-1}{2} \leq k \leq \frac{K-1}{2},$$

and where $K=N-L+1$ defines the range of k. The number of vectors in the subset $\{X(t)\}$ is now K×T. Decorrelation of the channel gains may be achieved by computing the new covariance matrix, which is given by $$\hat{R}_x^F = \frac{1}{KT} \sum_{t=1}^{T} \sum_{k=-(K-\frac{1}{2})}^{K-1/2} X_k(t) \cdot X_k(t)^H.$$

Note that, for this approach to work, the antenna(s) may have similar responses across the field of view.

A forward-backward moving average (for T<M) may also provide a smoothing enhancement. Notably, from $a_m = z_m^{-(N-1)/2}[1, z_m, \ldots z_m^{N-1}]^T$, it can be seen that the signals vectors are Hermitian symmetric. Stated differently, if the components of $a_m$ are order-reversed and conjugated, then $a_m$ remains invariant. For the sum of exponentials model (assuming one or more perfect antennas), the centro-Hermitian of the manifold vectors is A=JA*, where * denotes the complex conjugate, and where J is the anti-diagonal matrix. This property of shift invariant manifold vectors leads to $JR_x^*J=J(ASA^H)^*J+\sigma^2 JIJ=AS^*A^H+\sigma^2 I$, were $R_x=ASA^H+\sigma^2 I$, and where $R_x^*$ is the complex conjugate of the covariance matrix. Because $R_x^*$ and $JR_x^*J$ share the same signal sub-space, they can be averaged without altering the signal sub-space. Moreover, in principle, the delay estimates can be obtained by the following forward-backward matrix (if an infinite number of snapshots are available):

$$R_x^{FB} = \frac{1}{2}(R_x^F + J(R_x^F)^*J) = \frac{1}{2}A(S+S^*)A^H + \sigma^2 I.$$

This operation can be applied to the sub-vector responses $X_k(t)$ to obtain the reversed-conjugated sub-vector $\hat{X}_k(t)$. The final estimate of the covariance matrix, combining the forward and backward operations, can be expressed as $$\hat{R}_x^{FB} = \frac{1}{KT} \sum_{t=1}^{T} \sum_{k=-(K-\frac{1}{2})}^{K-1/2} \left( X_k(t) \cdot X_k(t)^H + \hat{X}_k(t) \cdot \hat{X}_k(t)^H \right).$$

Eigenvalue decomposition can be performed on this matrix. Notably, the first operation of eigenvalue decomposition techniques may be performed: estimating the signal and noise sub-space. Then, a 'spectral representation' of the signal can be obtained from $f_E(\omega)^{-2}$. This spectral representation is sometimes referred to as 'smoothed MUSIC.' Thus, in a classical MUSIC technique the covariance matrix is $R_x$, in a forward smoothed MUSIC technique the covariance matrix is $\hat{R}_x^F$, and in a forward backward smooth MUSIC technique the covariance matrix is $\hat{R}_x^{FB}$.

Figure 6:
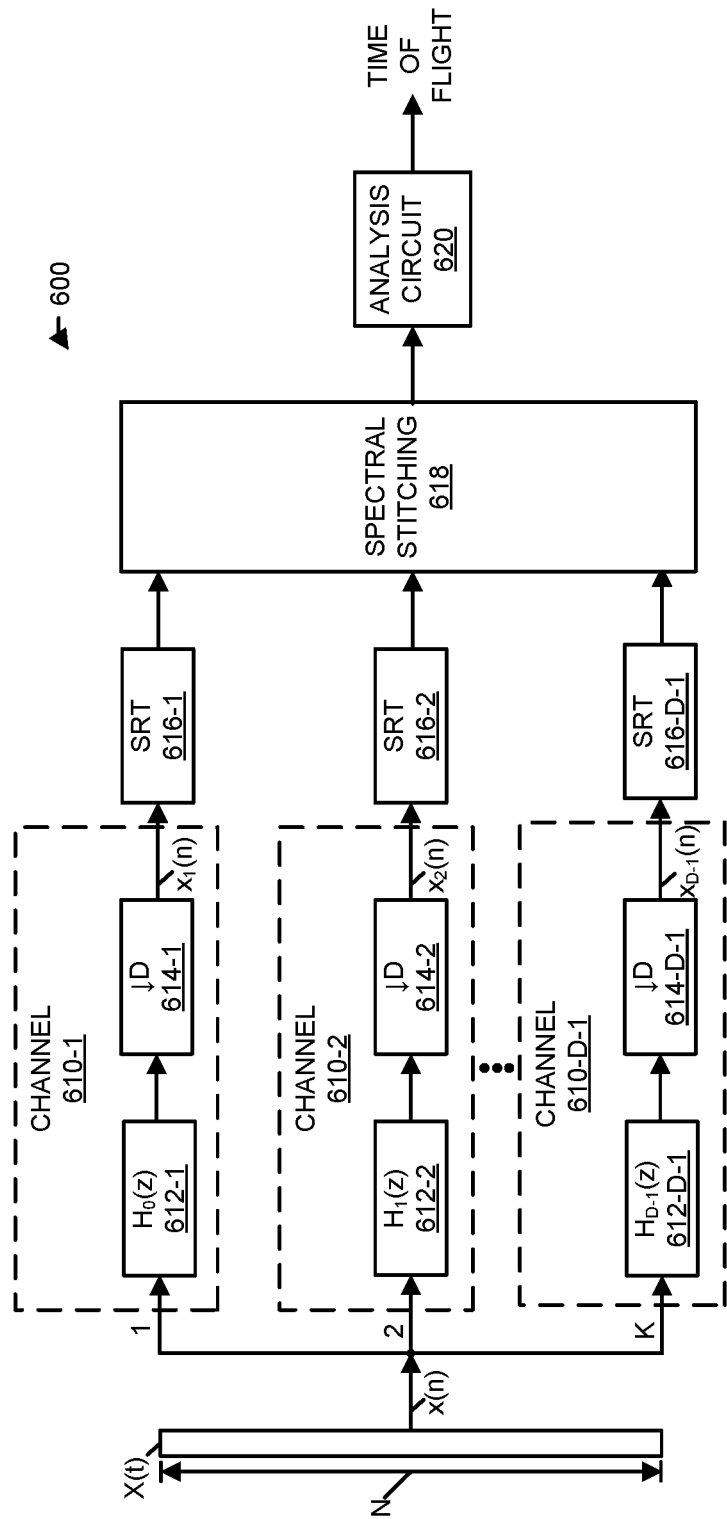
FIGS. 6 and 7 are block diagrams illustrating example receiver circuits in an electronic device, such as one of the electronic devices of FIG. 1.

In order to address these challenges in using a super-resolution technique (such as a MUSIC technique) to estimate a wireless-communication parameter (such as the time of arrival or distance), in some embodiments the communication technique may perform sub-band (or partial band) processing in parallel channels, including filtering and decimation, and the super-resolution technique. Then, the outputs from the sub-band processing may be combined and analyzed into to estimate one or more wireless-communication parameters. FIG. 6 presents a block diagram illustrating an example of a receiver circuit 600 in an electronic device, such as electronic device 110-1 in FIG. 1. Notably, this receiver circuit may provide D parallel channels 610 (such as, e.g., D=3). The parallel channels may each include or implement sub-band processing and a super-resolution technique. For example, channels 610 may include filters 612 (such as low-pass filters or LPF in particular sub-bands or time intervals), downsampling 614 (by D, which is the number of sub-bands or pseudo-arrays) and super-resolution technique (SRT) circuits 616 with Q elements per sub-band. The outputs from channels 610 may be combined, e.g., using spectral stitching 618. Then, linear fitting and false peak detection may be performed in analysis circuit (or module) 620 to estimate a wireless-communication parameter, such as the time of flight. Note that the input to receiver circuit 600 may be at least a single snapshot or observation in element space X(t). This observation may have a length N, which is the length of an aperture in time, frequency or space (which may be used to estimate a time of flight, a frequency or an angle of arrival). Moreover, in receiver circuit 600, $$Q = \frac{N}{D}.$$

The sub-band-based architecture in FIG. 6 may be used to implement a super-resolution technique, such as a MUSIC technique. Notably, assume that a-priori knowledge of the location of the delays that the electronic device would like to estimate (the desired analysis sub-band) is available. Then, the electronic device may analyze this particular sub-band in an optimal way. Moreover, there may be multiple sub-bands (D) in parallel.

In the receiver circuit, the complexity may be reduced while preserving Rayleigh resolution of the full aperture. For example, assume the sampling rate is Fs=B, while the signal bandwidth (BW) is $$\left[-\frac{B}{2}, \frac{B}{2}\right].$$

The length of the original aperture is $$\frac{N}{B}.$$

The sub-bands can be sampled at reduced rate $$\frac{Fs}{D} = \frac{B}{D},$$

and there is a decimation factor of $$\frac{N}{D} = Q$$

samples. Therefore, each sub-band may have the same length as the original aperture. Furthermore, the sub-band processing in the parallel channels can increase the SNR. For example, for maximally decimated filter banks, the noise power per sub-band remains the same, but the power of the sine waves increases with the decimation factor. Additionally, the sub-band processing may increase the line resolution. Notably, the effective spacing between frequencies observed in the sub-bands increases in proportion with the decimation factor. Therefore, the line resolution in the sub-bands will be greater than that in the full band. However, as D is increased, the number of elements Q for computing the covariance matrices used for super-resolution technique decreases, which results in reduced quality and performance loss (which may limit in the number of parallel channels).

The enhancement of the SNR in the receiver circuit can be estimated. Assume the model $x(n)=\Sigma_{m=1}^{M} A_m \exp(j\omega_m n)+v(n)$. Moreover, assume a maximally decimated analysis filter bank. The sub-band signal $x_m(n)$ is given by $x_d(n)=\Sigma_{m=1}^{M} A_m H_d(\exp(j\omega_m))\exp(jD\omega_m n)+v_d(n)$, where $v_d(n)=[h_d^* v(n)]\downarrow j_D$. Furthermore, the autocorrelation sequence of each sub-band is given by $R_{xdxd}(k)=\Sigma_{m=1}^{M} P_m|H_d(\exp(j\omega_m))|^2 \exp(jD\omega_m k)+R_{vdvd}(k)$. If the input sequence has a noise power $\sigma_v^2$ and $[|H_d(\exp(j\omega_m))^2|]\downarrow_D=1$, then each of the noise processes $v_d(n)$ has a variance $\sigma_v^2$. Consider the amplitude response of each analysis filter. A filter with a magnitude response $|H_d(\exp(j\omega_m))|^2=D$ will satisfy $[|H_d(\exp(j\omega_m))^2|]\downarrow_D=1$. Therefore, for the $d^{th}$ sub-band, $R_{xdxd}(k)=\tau_{\omega m \in Sd}(P_m D)\exp(jD\omega_m n)+\sigma_v^2 \delta(k)$. Additionally, the SNR for sub-band d equals D times the SNR for the full band for $\omega_m \in S_d$, or $SNR_{local\_sub-band d}=D \cdot SNR_{Full\_d}$ for $\omega_m \in S_d$.

The enhancement of the resolution in the receiver circuit can also be estimated.

Consider two frequencies that belong to the sub-band d, $\omega_p, \omega_q \in S_d$. In the full band, the spacing between the frequencies is $\Delta\omega_f=\omega_q-\omega_p$. These frequencies can be written as $$\omega_q = 2\pi \frac{d}{D} + \varphi_q$$

and $$\omega_q = 2\pi \frac{d}{D} + \varphi_p.$$

where $0 \leq \varphi_q$ and $$\varphi_p < 2\pi \frac{d}{D}.$$

The autocorrelation sequence of the $d^{th}$ sub-band is $R_{xdxd}(k)=(P_q D)\exp(j\hat\omega_q k)+(P_p D)\exp(j\hat\omega_p k)+\sigma_v^2 \delta(k)$, where $\hat\omega_q=D\omega_q \mod 2\pi$ and $\hat\omega_p=D\omega_p \mod 2\pi$, which implies that $\hat\omega_q=M\varphi_q$ and $\hat\omega_p=M\varphi_p$. Therefore, the spacing between the frequencies in the sub-band d is D times larger than it is in the full band or $\Delta\omega_{sub}=D \cdot \Delta\omega_{full}$. Furthermore, the line resolution in the sub-bands will be greater than in the full band, i.e., the resolution is increased.

Figure 7:
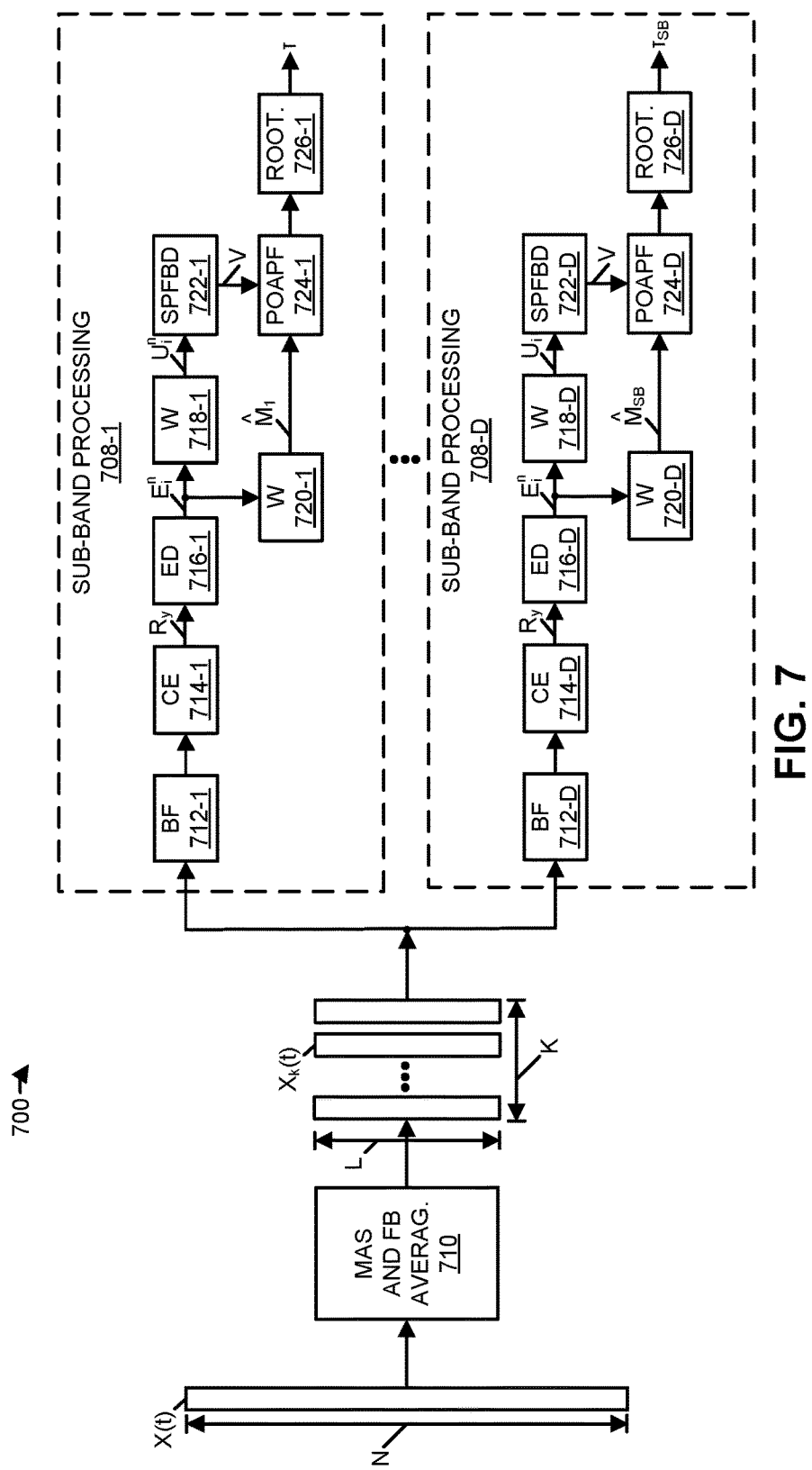

Another embodiment of a parallel sub-band super-resolution technique and transform domain processing for coherent sources (such as a multipath channel) is shown in FIG. 7, which presents a block diagram illustrating an example of a receiver circuit 700 in an electronic device, such as electronic device 110-1 in FIG. 1. The input to receiver circuit 700 may be at least a single snapshot or observation in sensor space X(t). This observation may have a length N, which is the length of a channel estimation vector. Receiver circuit 700 may perform moving average splitting (MAS) and forward-back (FB) averaging 710 on X(t), which results in an observation in sub-array sensor space $X_k(t)$. Note that the observation in the sub-array sensor space may have dimensions L×K, where L is the length of a sub-array vector for smoothing. This observation in the sub-array sensor space may include artificially created snapshots.

Then, receiver circuit 700 may have parallel sub-band processing 708, which may reduce the complexity of receiver circuit 700. Sub-band processing 708-1 (in sub-band #1) may include beamformer (BF) 712-1 with response WLXB and output $Y_k(t)=W^H X_k(t)$, while sub-band processing 708-D (in sub-band #SB) may include beamformer 712-D with response $W_{B \times L}$ and output $Y_k(t)=W^H X_k(t)$. By focusing on particular spectral areas or sub-bands, beamformers 712 may increase the SNR. In some embodiments, beamformers 712 zoom into particular frequencies (and reject others), or particular delays, or particular angular spreads of an antenna array.

Then, sub-band processing 708-1 may include: covariance estimate (CE) 714-1 (which produces covariance matrix $R_y$ in the sub-band space), and eigenvalue decomposition (ED) 716-1 (EVD) in a super-resolution technique (such as a MUSIC technique) to determine noise eigenvectors in the sub-band space $E_i^n$, where $i=\hat M+1, \ldots, B$. Moreover, filter W 718-1 (which is the opposite of beamformer 712-1) may provide noise eigenvectors in the sensor space $U_i^n$, and statistic test (ST) 720-1 may provide an estimate of the number of signals that are present $\hat M_1$. Next, sub-processing filter bank decimation (SPFBD) 722-1 may provide noise eigenvectors $V_{\hat M_1+1}^n \ldots V_B^n$ to the projection operation and polynomial formation (POAPF) 724-1, which determines $P=V \cdot V^H$ using $\hat M_1$ and $V_{\hat M_1+1}^n \ldots V_B^n$. Note $V_i^n=G \cdot U_i^n=G \cdot W \cdot E_i^n$. Furthermore, rooting 726-1 may determine a vector of estimated delays τ, which may provide increased resolution and reduced complexity in the rooting.

Alternatively, sub-band processing 708-D may include: covariance estimate 714-D (which produces covariance matrix $R_y$ in the sub-band space), and eigenvalue decomposition 716-D in a super-resolution technique (such as a MUSIC technique) to determine noise eigenvectors in the sub-band space $E_i^n$, where $i=\hat M+1, \ldots, B$. Moreover, filter W 718-D (which is the opposite of beamformer 712-1) may provide noise eigenvectors in the sensor space $U_i^n$, and statistic test 720-D may provide an estimate of the number of signals that are present $\hat M_{SB}$. Next, sub-processing filter bank decimation 722-D may provide noise eigenvectors $V_{\hat M_{SB}+1}^n \ldots V_B^n$ to the projection operation and polynomial formation 724-D, which determines $P=V \cdot V^H$ using $\hat M_{SB}$ and $V_{\hat M_{SB}+1}^n \ldots V_B^n$. Note $V_i^n=G \cdot U_i^n$. Furthermore, rooting 726-D may determine a vector of estimated delays $\tau_{SB}$.

The sub-band super-resolution technique may provide enhanced performance and reduced complexity. Notably, decomposing the full delay spread into sub-bands of continuous regions of delay spreads via some frequency domain filtering (e.g., beamforming to a frequency sub-band). Moreover, a super-resolution technique (such as a MUSIC technique) may be applied to each of the sub-bands, and frequency-domain filtering may be achieved by applying, to each snapshot vector, a beamforming matrix. The snapshot vector of length N may be transformed to a lower dimension sub-band space snapshot vector B. In some embodiments, the vector components of the beam-formed snapshot may be taken to be the B-successive values of the N DFT of the original snapshot vector. Because for each sub-band the beam-formed MUSIC operates on the B dimensional beam-spaced snapshot, the eigenvalue decomposition may be B×B, as opposed to N×N. Therefore, there may be significant computational savings by processing the sub-bands in parallel. Moreover, the signal-to-noise ratio may be increased using beamforming. Furthermore, the complex covariance matrix may be transformed into a real covariance matrix (which will provide computational savings for the eigenvalue decomposition).

The smoothing and covariance estimation in the communication technique can be described mathematically. Consider a sensor sub-array k of length L in the frequency domain and assume that there are M paths (although, in the communication technique, the number of paths may be initially unknown). The $k^{th}$ aperture signal is $X_k(t)=\Sigma_{m=1}^{M}s_m(t)a_{L,k}(\mu m)+n(t)$, where $s_m(t)$ is the $m^{th}$ path coefficient and $a_{L,k}(\mu_m)$ is the sensor array manifold for the sub-array k. Moreover, $\mu=-2\tau\Delta F$ and $\Delta F$ is the sampling spacing in the frequency domain. Therefore, $a_{L,k}(\mu m)$ can be expressed as $$\left[\exp\left(j\left(k-\frac{(L-1)}{2}\right)\pi\mu, \right.\right.$$
$$\left.\left.\exp\left(j\left(k-\frac{(L-2)}{2}\right)\pi\mu, \ldots \exp\left(j\left(k+\frac{(L-2)}{2}\right)\pi\mu, \exp\left(j\left(k+\frac{(L-1)}{2}\right)\pi\mu\right)\right.\right.\right]^T.$$

Note the conjugate symmetric property of the array manifold. Furthermore, note that the variable $\mu$ can be treated as the unknown frequency. Then, frequency estimation can be applied based on the principles described previously, which may allow the path delays to be determined.

Next, the covariance in the sub-band space may be computed. Notably, the transformation of each sub-array segment k from the sensor domain to the sub-band j space can be described as $x_{k,j}=W_j^H X_k(\omega)$, where $W_j^H$ is a B×L beamforming matrix. Then, perform moving-average smoothing for coherent signals to produce the forward smoothing covariance matrix for sub-band j (in the sub-band space)

$$R_{x_j}^{SB,FB} = \frac{1}{K \cdot T}\sum_{t=1}^{T}\sum_{k=-(K-1/2)}^{K-1/2}(x_{k,j}(t)\cdot x_{k,j}(t)^H + \hat{x}_{k,j}(t)\cdot \hat{x}_{k,j}(t)),$$

where K is the number of sub-arrays, each sub-array has an aperture L, T is the number of vector samples or snapshots (the default may be T=1). Note that the original eigenvalue decomposition may have been performed on a matrix of size B×B. Because the purpose of the sub-band filtering is to analyze or split the signal into small sub-band regions (which each containing a local delay spread), the sub-band size B may be chosen to be much smaller, e.g., B<L. Moreover, because the complexity of the eigenvalue decomposition scales approximately as $B^3$ instead of $L^3$, significant computational savings can be achieved In some embodiments, the beamforming in the sub-band processing includes a DFT beamformer. Consider a particular path delay $\tau$ with a corresponding variable $\mu=2\Delta F\cdot\tau$. Moreover, the beamformer may use as a weight vectors for the beamformers in the sub-bands the matrix $W_{j,B}=[w_L(\mu_{k1j}) w_L(\mu_{k2j}) \ldots w_L(\mu_{kBj})]$, where $$\mu_k = \frac{2k}{L}.$$

In these embodiments, the output of the beamformer as a function of a generic delay $\tau$ may be $w_L^H(\mu_k)a_L(\mu)=\Sigma_{l=0}^{L-1}\exp(-j\pi\mu_k)\exp(-j\pi\mu_k l)=A_L(\mu-\mu_k)$. Therefore, the output of beam k is an aliased sinc function, and the output of a sub-band includes B beams.

Figure 8:
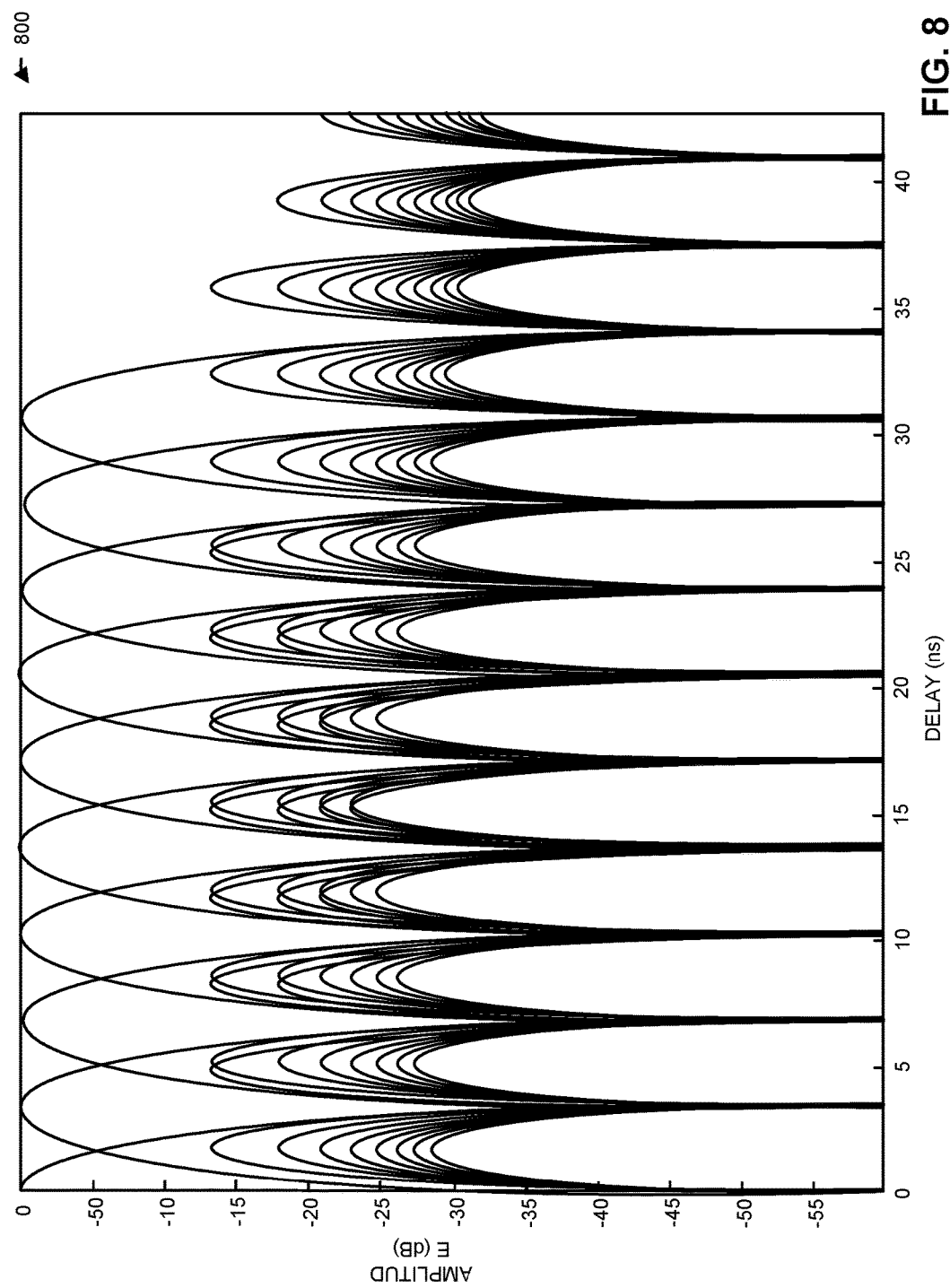
FIG. 8 is a drawing illustrating example beamforming options during receiving of wireless signals by an electronic device, such as one of the electronic devices of FIG. 1.

FIG. 8 presents a drawing illustrating example beamforming options 800 during receiving of wireless signals by an electronic device, such as electronic device 110-1 in FIG. 1. Notably, beamforming options 800 may corresponding to a DFT beamformer with, e.g., 10 beams per sub-band (and, more generally, B beam outputs), an L of 150 and a $\Delta F$ of 1.95 MHz. In FIG. 8, each of the lobes represents one beam. Moreover, the first sidelobe may have an amplitude that is, e.g., 10-30 dB lower than the main lobe, which may determine the rejection of other bands. Note that beam 1 may attenuate delays outside of the sub-band, but that because of high sidelobes it may still contain delays from other sub-bands that will fold or alias.

In other embodiments, a Dolph Chebychev beamformer is used separately or in addition to a DFT. Note that the sidelobes of a Dolph Chebychev beamformer may be reduced relative to a DFT beamformer. For example, the first sidelobe may have an amplitude that is, e.g., 30-60 dB lower than the main lobe. However, the main lobe width may be increased.

Furthermore, in some embodiments the covariance matrix in a sub-band can be transformed into a real matrix. Notably, assume that forward-backward covariance matrix in the sensor space is $\hat{R}_{senor}^{FB}$. Consider the beamforming transformation to sub-band j, $W_j^H$. Then, assuming that the columns of the beamforming transformations are conjugate symmetric (which is true for DFT beamformers), it can be shown that the forward-back covariance in the sub-band space $\hat{R}_{senor}^{FB}=W_j^H\hat{R}_{senor}^{FB} W_j$ is real. This can be proved by exploiting the cento-Hermitian and persymmetric property of the covariance matrix $\hat{R}_{senor}^{FB}$. This may have significant computational savings for the eigenvalue decomposition computation (real versus complex).

Figure 9:
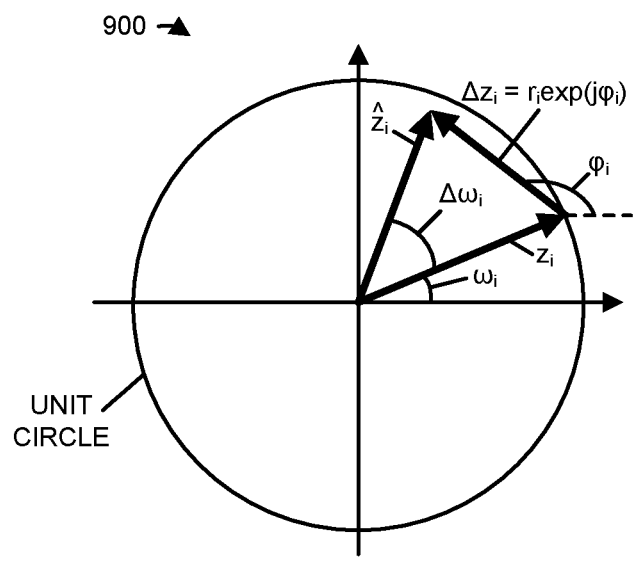
FIG. 9 is a drawing illustrating a comparison of different multiple signal classification (MUSIC) techniques.

Furthermore, in some embodiments a root MUSIC technique may be used. Notably, root MUSIC may have better performance than spectral MUSIC. Consider the error $\Delta z_i$ in the true root $z_i$ for the estimation of the signal frequency. As shown in FIG. 9, which presents a drawing in Z-plane 900 illustrating a comparison of different MUSIC techniques, if the error $\Delta z_i$ has only radial direction then there may be no error with root MUSIC. However, with spectral MUSIC such a radial error may make the estimated root too far away from the unit circle. This may result in at least two problems. First, the peaks of the spectrum may be less defined, making the definition of a peak in the spectrum $S(\exp(j\mu))$ more challenging. Second, for two closely spaced roots, the error may result in only one peak, thereby causing a loss in resolution. In contrast, a rooting polynomial may have a complexity of $N^3$, which can be solved in a variety of ways.

In spectral MUSIC, a motivation for the computation of the null spectra may be $a^H(\mu_i)\cdot V_k=0$, where $\mu_i$ is a signal frequency and k=M+1, ..., N. Polynomials may be defined using the noise eigenvectors $V_k$: $V_k(z)=\Sigma_{n=1}^{N} v_{kn} z^{-(n-1)}$, where k=M+1, ..., N. Then, given $z_i=\exp(j\mu_i)$, with i=1, ..., M, the signal zeros are the roots of each of the polynomials $V_k(z)$. Now, define $P(z)=\Sigma_{k=M+1}^{N} V_k(z)V_k^*(1/z^*)$. The spectral MUSIC may be obtained by evaluating P(z) on the unit circle (z=exp(j$\mu$)), which yields $$S(\exp(j\mu)) = \frac{1}{P(\exp(j\mu))}.$$

Moreover, the polynomial P(z) may be written as $P(z)=c\Sigma_{l=1}^{M}(1-z_1 z^{-1})(1-z_1^* z)\Sigma_{l=M+1}^{N}(1-z_1 z^{-1})(1-z_1 z)$.

This polynomial can be rewritten as $P(z)=H_1(z)H_1^*(1/z^*)H_2(z)H_2^*(1/z^*)$, where $H_1(z)$ includes the signal zeros and $H_2(z)$ includes the extraneous zeros that are inside the unit circle. Let $H(z)=H_1(z)H_2(z)$. Then, $P(z)=H(z)H^*(1/z^*)$. Moreover, the polynomial $H(z)$ can be obtained from $P(z)$ with spectral factorization. Note that spectral factorization may allow the rooting to be performed in a half-order polynomial (with $N^3$ complexity).

Furthermore, the roots of $H(z)$ are inside or on the unit circle. The M signal roots are also the roots of the polynomial $H(z)$. Root MUSIC estimates the signal zeros from the roots of $H(z)$ forming a vector $h=[h_0, h_1, \ldots, h_{N-1}]^T$, where $H(z)=h_0+h_1 z^{-1}+\ldots+h_{N-1} z^{-(N-1)}$. In the presence of noise, the signal frequencies may be computed from an estimate of the factorized polynomial $\hat{H}(z)$. From a statistical test, the electronic device may have an estimate of the signal present $\hat{M}$. Note that the rooting procedure may select the $\hat{M}$ roots that are closer to the unit circle, because these roots result in the largest peaks or have more orthogonal signal directions. These roots may be $\hat{z}_i=|\hat{z}_i| \exp(j\mu_i)$. Note that the time of flight may be estimated from the angle of the estimated signal frequency.

In some embodiments, the spectral factorization is based on Kalman equations for canonical modeling. Consider a polynomial given by $S_y(z)=R_y(-n)z^n+\ldots+R_y(-1)z^{-1}+R_y(0)+R_y(1)z^{-1}+\ldots+R_y(n)z^{-n}$, where $R_y(n)$ is the autocorrelation sequence of the process. This process $y(n)$ can be represented with its covariance matric $R_y$. Spectral factorization of the polynomial may be equivalent to the triangular factorization of the matrix $R_y=LDL^H$. The spectral factorization of the polynomial may correspond to the $i^{th}$ row of the matrix $L$ ($i^{th}$ iteration). At convergence, the row may have the form $[0 \ldots 0\ HF^{N-1}K_p \ldots HFK_p\ HK_p\ 1]$. Note that the iterations may be $K_{p,i}=[N_i-F\Sigma_i H_i^*]R_{e,i}^{-1}$, $R_{e,i}=R_y(i)-H_i \Sigma_i H_i^*$, $\Sigma_{i+1}=F\Sigma_i H_i^*+K_{p,i}R_{e,i}K_{p,i}^*$, where F is a matrix of is adjacent to the diagonal, $H=[0 \ldots 0\ 1]$, and N is a vector of covariances in the sub-bands $[R_y(n)\ R_y(n-1) \ldots R_y(2)\ R_y(1)]^T$. Note that the polynomial length is $N^3$, which significantly reduces the complexity for rooting the polynomial. This approach provides an efficient computational framework for rooting the polynomial and, thus, for leveraging the advantages of Root MUSIC.

In some embodiments, sub-bands are stitched together after the sub-band processing and the super-resolution technique. This stitching may address non-idealities of the low-pass filters or other impairments that can result in a distortion relative to an assumed sum of exponentials model. Notably, the low-pass filters may be non-ideal because that there is a finite sidelobe level. For example, long and high sidelobes may introduce aliasing problems in the decimation process. A variety of approaches may be used to reduce the aliasing. In some embodiments, different parts of the spectrum are affected differently from aliasing. (where the tails of the aliasing band are small). The sub-band overlap may be used to exploit this effect. In these embodiments, the central part for each overlapping sub-band may be used. Moreover, in some embodiments, oversampling (other than a default, e.g., maximally decimated filter bank) is used. The oversampling may reduce the overlap of the adjacent Nyquist intervals. Furthermore, in some embodiments low-pass filters can use a type of windowing to reduce the sidelobe levels. Note that optimization of the filter bank can be achieved with an 'optimal' decimated filter bank that uses a low-pass filter.

Figure 10:
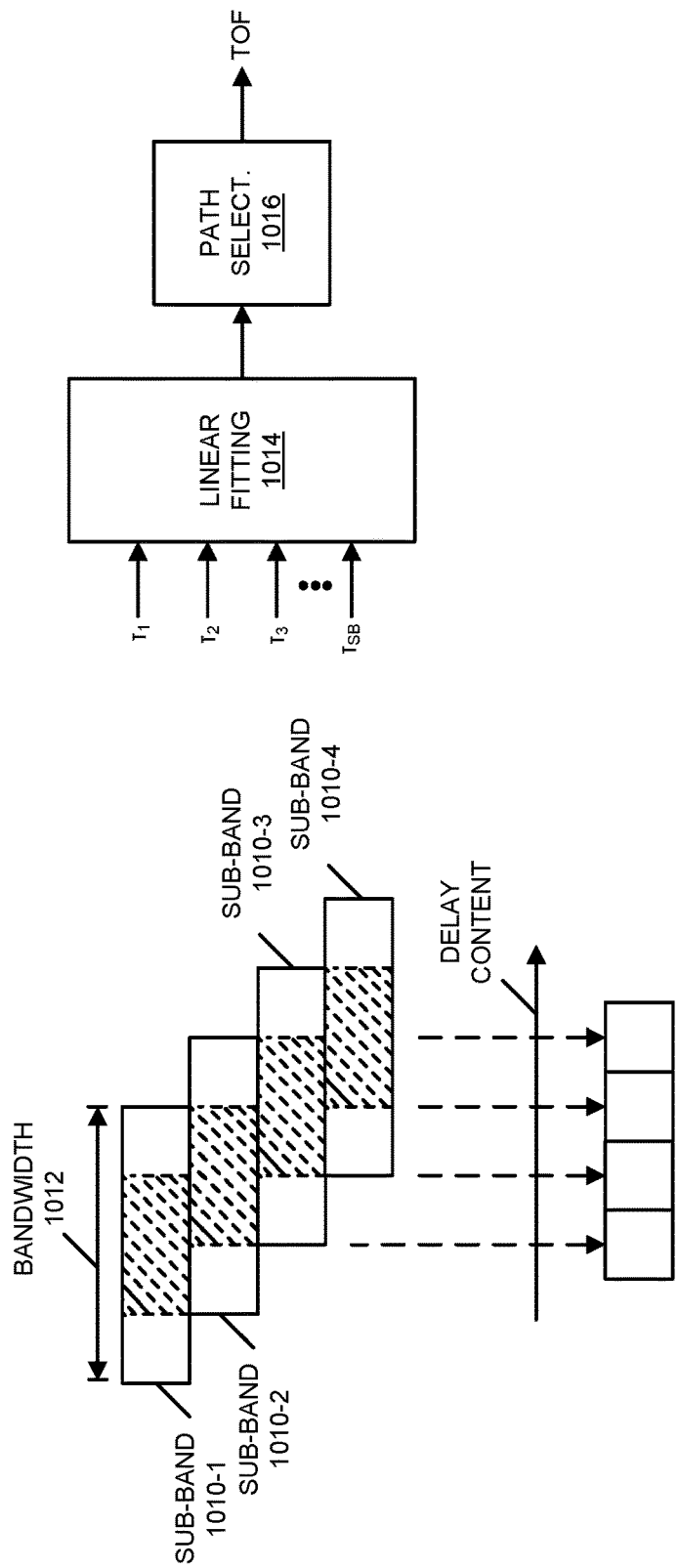
FIG. 10 is a drawing illustrating example stitching of overlap sub-bands.

FIG. 10 presents a drawing illustrating example stitching of overlap sub-bands 1010. Notably, the center of each of the overlapping sub-bands may be stitched together. Each of sub-bands 1010 may have a bandwidth 1012 of D/B. The resulting delay content may include delays $\tau$ for sub-bands 1010. Then, linear fitting 1014 (and, more generally, a linear or a nonlinear regression technique) may be used to evaluate a pseudo-spectrum that compares an observation Y(f) with a predicted response based on known P(f), estimated $g_p$ and $T_p$, and observed bandwidth f: $|Y(f)-P(f)\cdot E_{p=1}^P g_p \exp(-j2\pi\tau_p f)|^2$. Next, path selection 1016 may be used to estimate, in this example, the time of flight.

Figure 11:
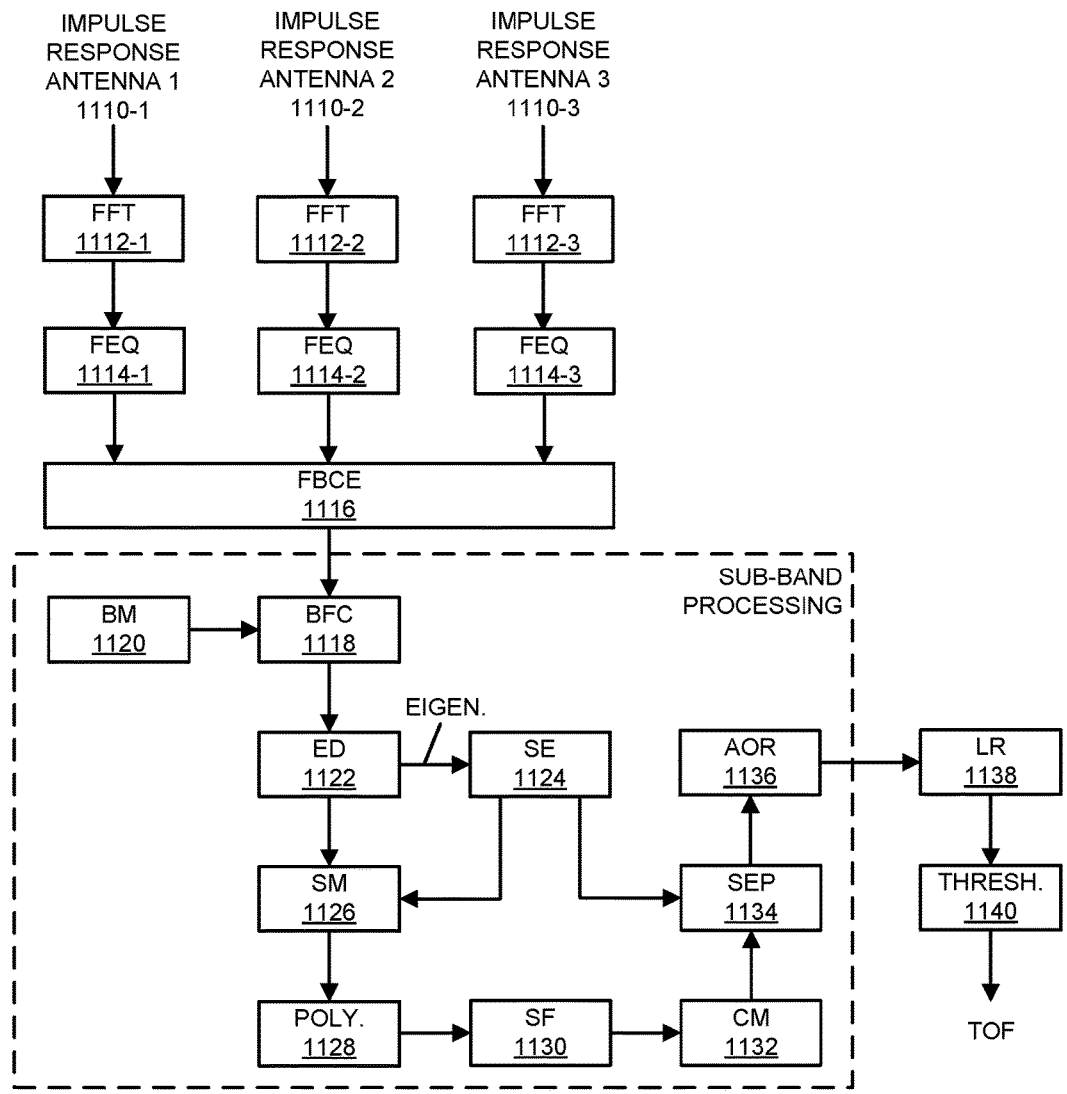
FIG. 11 is a block diagram illustrating an example of a receiver circuit in an electronic device, such as one of the electronic devices of FIG. 1.

FIG. 11 presents a block diagram illustrating an example of a receiver circuit 1100 in an electronic device, such as electronic device 110-1 in FIG. 1. This receiver circuit may illustrate operations in the communication technique and associated linear algebra operations.

In receiver circuit 1100, a Fourier transform (FFT) 1112 and equalization (FEQ) 1114 may be applied to impulse responses 1110 from multiple antennas or antenna elements. Then, a forward-back covariance estimate (FBCE) 1116 may be determined.

Moreover, in each sub-band, the processing may include: computing a beam-formed covariance (BFC) 1118 using a beamforming matrix (BM) 1120 (which may be designed offline). Next, eigenvalue decomposition 1122 may be performed, and the eigenvectors may be used in source enumeration (SE) 1124 and to computer a spectral matrix (SM) 1126. Furthermore, a polynomial may be extracted 1128, spectral factorization (SF) 1130 may be performed (e.g., using a Kalaman update equation), and a companion matrix (CM) 1132 may be formed. (In some embodiments a rooting procedure based on Laguerre's technique is employed.) Additionally, a sparse eigenvalue problem (SEP) 1134 may be solved to dynamically compute eigenvalues (such as maximum eigenvalues). The angle of the roots (AOR) 1136 may be determined, and the angle of the roots may be used in linear regression (LR) 1138 (such as dynamic Cholesky factorization and, more generally, another supervised-learning technique). Then, a thresholding operation 1140 may be used to estimate, e.g., the time of flight. Note that the eigenvalue decomposition 1122 may be tri-diagonal and may use an implicit QR technique to determine the eigenvalues and the eigenvectors.

In some embodiments, linear regression with multiple predictors and an F-statistic is used. For example, the predictors may be derived using a smoothed MUSIC technique. Notably, $y_n$ may be regressed on the variables $\beta_0, \beta_1, \ldots \beta_p$ (for the p paths detected using the MUSIC technique). Note that the $\beta_k$ are the predictor variables that were identified. After linear regression, $\hat{y}_n=\beta_0+\beta_1 s_1+\beta_2 s_2+\ldots+\beta_p s_p$, for $n=1, \ldots, N$. Then, define a residual sum of squares $RSS=\Sigma_{n=1}^N(y_n-\hat{y}_n)^2$. Moreover, define $RSS(p)=\Sigma_{n=1}^N(y_n-\hat{y}_n^p)^2$, where RSS is always less than RSS(p). Note that $\hat{y}_n^p$ is the prediction value when $y_n$ is regressed on the variables $\beta_k$ except $p \in [1\ P]$. Next, hypothesis testing may be performed with a null hypothesis of $\beta_p=0$. For example, the F-statistic may be defined as $$F(p) = \frac{(RSS(p) - RSS)}{RSS/(n-p-1)}.$$

An F-test may be used to provide information about whether each individual predictor is related to the response, by, e.g., reporting the partial effect of adding that variable to a linear fitting model $|X(f)-P(f)\cdot\Sigma_{p=1}^P g_p \exp(-j2\pi\tau_p f)|^2$.

In an equivalent formulation, liner regression with multiple predictors may use a t-statistic and a p-value. Notably hypothesis tests may be performed on each of the coefficients $\beta_p$. The null hypothesis $H_0$ is that there is not relationship between Y and $S_p$, so $\beta_p=0$. The alternative hypothesis $H_1$ is that there is a relationship between Y and $S_p$, so $\beta_p \neq 0$. In order to define a statistical test, two parameters may be needed: the estimate $\hat{\beta}_p$ after the multiple regression test; and the standard deviation of each of the variables $SE(\hat{\beta}_p)=(S^H S)_{pp}^{-1}$. If $\hat{\beta}_p$ is far enough from zero, then it can be inferred that the hypothesis $H_1$ is true. However, how far from zero depends on $SE(\hat{\beta}_p)$. If the standard deviation is very small, then even a small $\hat{\beta}_p$ can provide evidence that $\beta_p \neq 0$. But if $SE(\hat{\beta}_p)$ is large, then a large absolute value of $\hat{\beta}_p$ is needed to reject the null hypothesis. For this purpose, the t-statistic can be computed $t=\hat{\beta}_p/SE(\hat{\beta}_p)$. The t-statistic measures the standard deviations that $\hat{\beta}_p$ is away from zero. Note that in a Gram-Schmidt procedure for multiple regression, the $p^{th}$ multiple regression coefficient is the univariate regression of y on the variable $z_p$, which is the residual after $s_p$ is regressed on all the other variables. Moreover, note that $$\hat{\beta}_p = \frac{\langle zp, y \rangle}{\langle zp, zp \rangle}$$

and $$\text{var}(\hat{\beta}_p) = \frac{\sigma 2}{\|zp\|2} = SE(\hat{\beta}_p).$$

If indeed there is no relationship between Y and $S_p$, then the t-statistic will have a t-distribution. Moreover, if N is large enough the distribution will approach Gaussian. If $|t|$ is large, then it is unlikely to accept the hypothesis $H_0$. Notably, the probability assuming that the null hypothesis is correct is $Pr(t' \geq |\hat{\beta}_p/SE(\hat{\beta}_p)|)$. This probability is called the p-value. A small p-value indicates that it is unlikely to observe such a large t-statistic by chance, given the absence of any real association between the predictor and the response. Therefore, if a small p-value occurs, the null hypothesis can be rejected. There is a relationship between the t-statistic and the F-statistic described previously: the square of each t-statistic is the corresponding F-statistic. Note that W is approximately $N(\mu, 1)$, Y is approximately $\chi_m^2$, and $T=W/\sqrt{Y/m}$, which is a t distribution with m degrees of freedom and non-centrality parameter $\mu$.

After the sub-band processing and the super-resolution technique, the communication technique may estimate the wireless-communication parameter (such as the time of arrival) by performing estimation and thresholding. Because the dimension of the problem has been reduced to M, a root MUSIC technique may be used to provide better resolution. Notably, for each sub-band the spectral or root MUSIC technique may be solved and the output may include the peak locations (corresponding to path delays) or root locations. Denote the vector of delays per sub-band $\tau_j$. The candidate delays found from the sub-bands can be collected. Then, the powers of the delays may be solved for in order to eliminate spurious peaks. Consider the linear fitting model $|X(f)-P(f)\cdot\Sigma_{p=1}^P g_p \exp(-j2\pi\tau_p f)|^2$, where $X(f)$ is the channel estimate observation vector and $P(f)$ is the frequency representation of the transmitted signal. Note that $\hat{\tau}_p$ are the estimated delays. The goal is to solve for the powers $|s_p|^2$. A power threshold may be defined, and paths below the threshold may be rejected. The first among the valid paths may be declared as the time of arrival. Note that the threshold may be determined using a supervised-learning technique with different realizations or implementations of multipath profiles.

Figure 12:
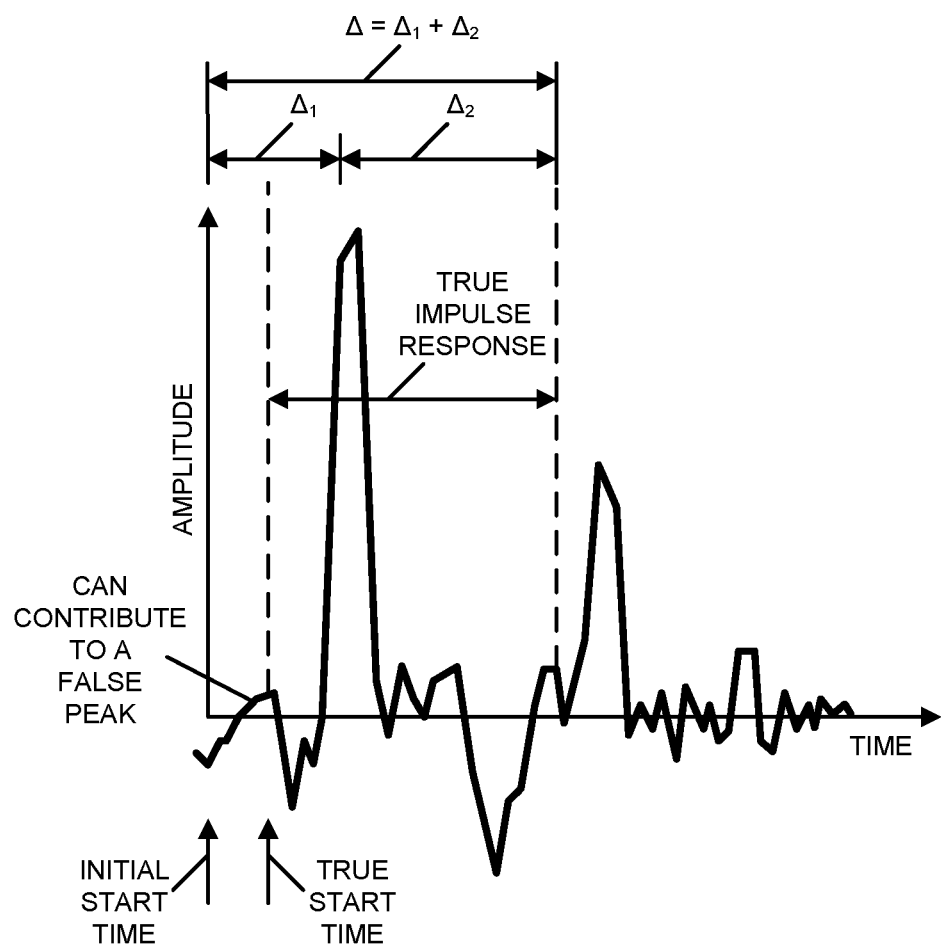
FIG. 12 is a drawing illustrating example wireless signals during communication between electronic devices, such as the electronic devices of FIG. 1.

As shown in FIG. 12, which presents a drawing illustrating wireless signals during communication between electronic devices 110 in FIG. 1, the processing window using in the communication technique may include the composite channel impulse response and false peaks. The wireless-communication parameter(s) (such as the time of arrival or the direction of arrival) may be estimated using a window or time interval of data of length $\Delta$. For example, the time interval may be 25 or 30 ns. More generally, the time interval may be less than 100 ns. Note that the data may have been averaged and may de-spread (in the presence of a spreading code).

In FIG. 12, $\Delta$ equals $\Delta_1$ plus $\Delta_2$. $\Delta_1$ is the time interval between an initial guess at the start time and the true (initially unknown) start time. For example, $\Delta_1$ may be 4 ns. This means that the initial start time may be approximately four samples before the true start time. Note that peaks during $\Delta_1$ can contribute to a false peak during analysis using a super-resolution technique, such as a MUSIC technique. In general, as $\Delta_1$ increases, the number of false peaks increased. Moreover, $\Delta_2$ is a time interval that determines the length of the true impulse response.

In a simulation with an SNR of −15 dB, 2000 channels, $\Delta$ of 25 ns, a bandwidth of 375 MHz, N equal to three, and 256-bit FFT, the communication technique may be used to estimate distance. For example, after identifying the lower time of arrival and, thus, the associated line-of-sight wireless signal, the distance can be determined with an accuracy of: 3.9 cm 68% of the time, 10.2 cm 11% of the time, 20 cm 4.9% of the time, and 100.3 cm 0.6% of the time.

In some embodiments, the covariance matrix $R_y$ is, e.g., a 12×12 matrix based on B=12 beams. Moreover, the length of the channel estimation vector N may be, e.g., 256 and the sub-vector length L may be, e.g., 144. Moreover, the beamformers may be implemented using DSP.

Note that the communication technique may be used in dynamic wireless environments, where the time of arrival is time variant, which may prevent the use of multiple snapshots or instances of the measured wireless samples.

In some embodiments, the sub-bands in the communication technique are associated with chunks of delay spreads in the time domain. These sub-bands may be accessed by beamforming to the sub-bands from the frequency domain channel (as opposed to frequency hopping). Moreover, the sub-band processing in the communication technique may correspond to a covariance matrix computation that is used to estimate a signal/noise sub-space in the time domain. The filtering and decimation in the communication technique may correspond to the processing of the signal/noise eigenvectors in the frequency domain, which may be enabled by the delay-spread limited eigenvector (because of the beamforming in the sub-bands). Furthermore, the parallel channels in the communication technique may correspond to individual pieces of the overall impulse response in the time domain. Additionally, in the communication technique the bandwidth of the signal may be fixed. Consequently, the processing in the communication technique may start from this fixed bandwidth and may beamform to individual pieces of the impulse response (or the sub-bands). Then, using decimation, the resolutions can be increased. Note that parallel in the communication technique may correspond to processing individual pieces of the channel impulse response from a fixed-bandwidth channel estimate.

We now describe embodiments of an electronic device. FIG. 13 presents a block diagram of an electronic device 1300 (which may be a cellular telephone, an access point, another electronic device, etc.) in accordance with some embodiments. This electronic device includes any/all of: processing subsystem 1310, memory subsystem 1312, and/or networking subsystem 1314. Processing subsystem 1310 includes one or more devices configured to perform computational operations. For example, processing subsystem 1310 can include one or more microprocessors, application-specific integrated circuits (ASICs), graphics processing units (GPUs), microcontrollers, programmable-logic devices, and/or one or more digital signal processors (DSPs).

Memory subsystem 1312 includes one or more devices for storing data and/or instructions for processing subsystem 1310 and networking subsystem 1314. For example, memory subsystem 1312 can include dynamic random access memory (DRAM), static random access memory (SRAM), a read-only memory (ROM), flash memory, and/or other types of memory. In some embodiments, instructions for processing subsystem 1310 in memory subsystem 1312 include: one or more program modules or sets of instructions (such as program instructions 1322 or operating system 1324), which may be executed by processing subsystem 1310. For example, a ROM can store programs, utilities or processes to be executed in a non-volatile manner, and DRAM can provide volatile data storage, and may store instructions related to the operation of electronic device 1300. Note that the one or more computer programs may constitute a computer-program mechanism, a computer-readable storage medium or software. Moreover, instructions in the various modules in memory subsystem 1312 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1310. In some embodiments, the one or more computer programs are distributed over a network-coupled computer system so that the one or more computer programs are stored and executed in a distributed manner.

In addition, memory subsystem 1312 can include mechanisms for controlling access to the memory. In some embodiments, memory subsystem 1312 includes a memory hierarchy that comprises one or more caches coupled to a memory in electronic device 1300. In some of these embodiments, one or more of the caches is located in processing subsystem 1310.

In some embodiments, memory subsystem 1312 is coupled to one or more high-capacity mass-storage devices (not shown). For example, memory subsystem 1312 can be coupled to a magnetic or optical drive, a solid-state drive, or another type of mass-storage device. In these embodiments, memory subsystem 1312 can be used by electronic device 1300 as fast-access storage for often-used data, while the mass-storage device is used to store less frequently used data.

Figure 13:
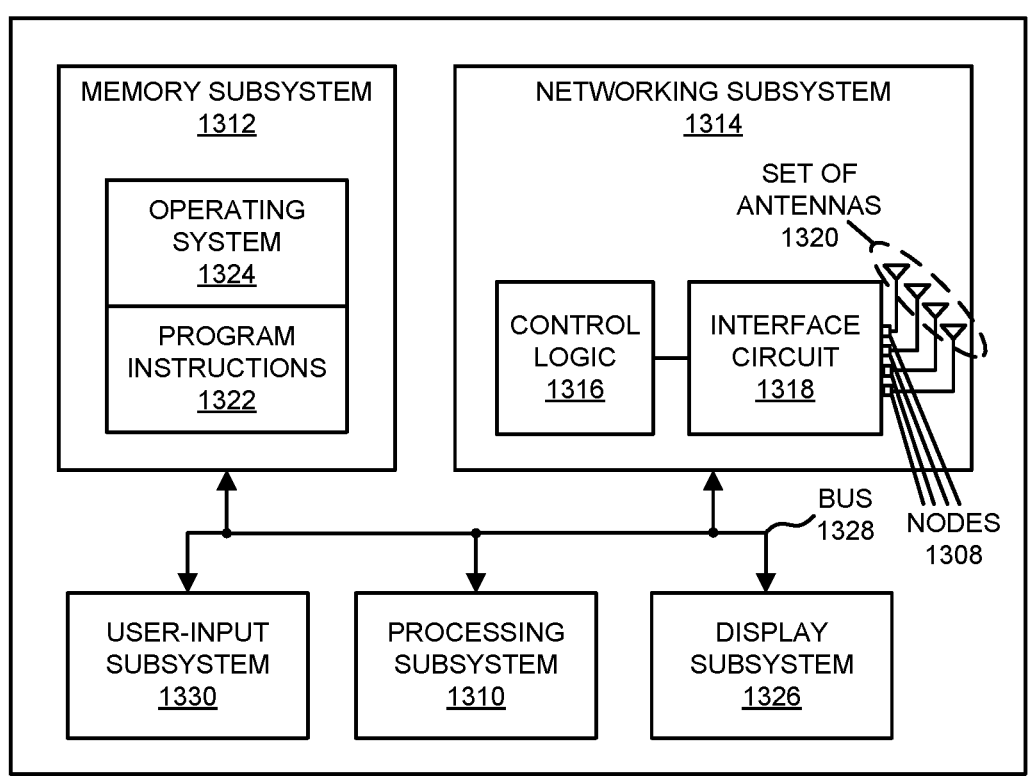
FIG. 13 is a block diagram illustrating an example of one of the electronic devices of FIG. 1.

Networking subsystem 1314 includes one or more devices configured to couple to and communicate on a wired and/or wireless network (i.e., to perform network operations), including: control logic 1316, an interface circuit 1318 and a set of antennas 1320 (or antenna elements) in an adaptive array that can be selectively turned on and/or off by control logic 1316 to create a variety of optional antenna patterns or 'beam patterns.' (While FIG. 13 includes set of antennas 1320, in some embodiments electronic device 1300 includes one or more nodes, such as nodes 1308, e.g., a pad, which can be coupled to set of antennas 1320. Thus, electronic device 1300 may or may not include set of antennas 1320.) For example, networking subsystem 1314 can include a Bluetooth™ networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, and/or another networking system.

Networking subsystem 1314 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 1300 may use the mechanisms in networking subsystem 1314 for performing simple wireless communication between the electronic devices, e.g., transmitting advertising or beacon frames and/or scanning for advertising frames transmitted by other electronic devices.

Within electronic device 1300, processing subsystem 1310, memory subsystem 1312, and networking subsystem 1314 are coupled together using bus 1328 that facilitates data transfer between these components. Bus 1328 may include an electrical, optical, and/or electro-optical connection that the subsystems can use to communicate commands and data among one another. Although only one bus 1328 is shown for clarity, different embodiments can include a different number or configuration of electrical, optical, and/or electro-optical connections among the sub systems.

In some embodiments, electronic device 1300 includes a display subsystem 1326 for displaying information on a display, which may include a display driver and the display, such as a liquid-crystal display, a multi-touch touchscreen, etc. Display subsystem 1326 may be controlled by processing subsystem 1310 to display information to a user (e.g., information relating to incoming, outgoing, or an active communication session).

Electronic device 1300 can also include a user-input subsystem 1330 that allows a user of the electronic device 1300 to interact with electronic device 1300. For example, user-input subsystem 1330 can take a variety of forms, such as: a button, keypad, dial, touch screen, audio input interface, visual/image capture input interface, input in the form of sensor data, etc.

Electronic device 1300 can be (or can be included in) any electronic device with at least one network interface. For example, electronic device 1300 may include: a cellular telephone or a smartphone, a tablet computer, a laptop computer, a notebook computer, a personal or desktop computer, a netbook computer, a media player device, an electronic book device, a MiFi® device, a smartwatch, a wearable computing device, a portable computing device, a consumer-electronic device, an access point, a router, a switch, communication equipment, test equipment, as well as any other type of electronic computing device having wireless communication capability that can include communication via one or more wireless communication protocols.

Although specific components are used to describe electronic device 1300, in alternative embodiments, different components and/or subsystems may be present in electronic device 1300. For example, electronic device 1300 may include one or more additional processing subsystems, memory subsystems, networking subsystems, and/or display subsystems. Additionally, one or more of the subsystems may not be present in electronic device 1300. Moreover, in some embodiments, electronic device 1300 may include one or more additional subsystems that are not shown in FIG. 13. Also, although separate subsystems are shown in FIG. 13, in some embodiments some or all of a given subsystem or component can be integrated into one or more of the other subsystems or component(s) in electronic device 1300. For example, in some embodiments program instructions 1322 is included in operating system 1324 and/or control logic 1316 is included in interface circuit 1318.

Moreover, the circuits and components in electronic device 1300 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 1314. This integrated circuit may include hardware and/or software mechanisms that are used for transmitting wireless signals from electronic device 1300 and receiving signals at electronic device 1300 from other electronic devices. Aside from the mechanisms herein described, radios are generally known in the art and hence are not described in detail. In general, networking subsystem 1314 and/or the integrated circuit can include any number of radios. Note that the radios in multiple-radio embodiments function in a similar way to the described single-radio embodiments.

In some embodiments, networking subsystem 1314 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used a Wi-Fi communication protocol as an illustrative example, in other embodiments a wide variety of communication protocols and, more generally, wireless communication techniques may be used. Thus, the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program instructions 1322, operating system 1324 (such as a driver for interface circuit 1318) or in firmware in interface circuit 1318. Alternatively or additionally, at least some of the operations in the communication technique may be implemented in a physical layer, such as hardware in interface circuit 1318. In some embodiments, the communication technique is implemented, at least in part, in a MAC layer and/or in a physical layer in interface circuit 1318.

While examples of numerical values are provided in the preceding discussion, in other embodiments different numerical values are used. Consequently, the numerical values provided are not intended to be limiting.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
multiple nodes configured to communicatively couple to multiple antennas; and
an interface circuit, communicatively coupled to the multiple nodes, configured to communicate with a second electronic device, and configured to:
receive samples of wireless signals in a time interval, wherein the wireless signals are associated with the second electronic device and the wireless signals have a fixed bandwidth;
split the samples of the wireless signals into a plurality of parallel channels;
perform sub-band processing on the samples of the plurality of parallel channels to improve a resolution of the samples, wherein the sub-band processing comprises filtering and decimation of at least a subset of the samples, and wherein the sub-band processing further comprises performing a super-resolution technique; and combine outputs from the parallel channels to estimate a time of arrival of the wireless signals.

2. The electronic device of claim 1, wherein the samples of the wireless signals correspond to single instances of one or more multipath signals associated with a number of paths in a wireless environment of the electronic device.

3. The electronic device of claim 1, wherein the sub-band processing is configured to increase a signal-to-noise ratio of one or more of the samples of the wireless signals.

4. The electronic device of claim 1, wherein the interface circuit is configured to estimate a distance between the electronic device and the second electronic device based at least in part on the samples of the wireless signals and the estimated time of arrival.

5. The electronic device of claim 1, wherein the super-resolution technique comprises one of: a multiple signal classification (MUSIC) technique or a linear-prediction super-resolution technique.

6. The electronic device of claim 1, wherein the samples of the wireless signals comprise one or more of: time samples, spatial samples or frequency samples.

7. The electronic device of claim 1, wherein the communication with the second electronic device comprises ultra-wide-band communication.

8. An electronic device, comprising:
multiple nodes configured to communicatively couple to multiple antennas; and
an interface circuit, communicatively coupled to the multiple nodes, configured to communicate with a second electronic device, and configured to:
receive samples of wireless signals in a time interval, wherein the wireless signals are associated with the second electronic device and the wireless signals have a fixed bandwidth;
split the samples of the wireless signals into a plurality of parallel channels;
perform sub-band processing on the samples of the plurality of parallel channels to improve a resolution of the samples of the wireless signals, wherein the sub-band processing comprises filtering and decimation of at least a subset of the samples, and wherein the sub-band processing comprises a super-resolution technique; and
combine outputs from the parallel channels to determine a distance between the electronic device and the second electronic device.

9. The electronic device of claim 8, wherein the samples of the wireless signals correspond to single instances of one or more multipath signals associated with a number of paths in a wireless environment of the electronic device.

10. The electronic device of claim 8, wherein the sub-band processing is configured to increase a signal-to-noise ratio of one or more of the samples of the wireless signals.

11. The electronic device of claim 8, wherein the interface circuit is configured to determine a time of arrival of the wireless signals, and the determining of the distance is based at least in part on the outputs and the estimated time of arrival.

12. The electronic device of claim 8, wherein the super-resolution technique comprises one of: a multiple signal classification (MUSIC) technique or a linear-prediction super-resolution technique.

13. The electronic device of claim 8, wherein the samples of the wireless signals comprise one or more of: time samples, spatial samples or frequency samples.

14. The electronic device of claim 8, wherein the communication with the second electronic device comprises ultra-wide-band communication.

15. An electronic device, comprising:
a node configured to communicatively couple to an antenna; and
an interface circuit, communicatively coupled to the node, configured to communicate with a second electronic device, and configured to:
receive samples of wireless signals in multiple instances of a time interval, wherein the wireless signals are associated with the second electronic device and the wireless signals have a fixed bandwidth;
split the samples of the wireless signals into a plurality of parallel channels;
perform sub-band processing on the samples of the plurality of parallel channels to improve a resolution of the samples of the wireless signals, wherein the sub-band processing comprises filtering and decimation of at least a subset of the samples, and wherein the sub-band processing comprises a super-resolution technique; and
combine outputs from the parallel channels to estimate a time of arrival of the wireless signals.

16. The electronic device of claim 15, wherein the samples of the wireless signals in a given instance of the time interval correspond to single instances of one or more multipath signals associated with a number of paths in a wireless environment of the electronic device.

17. The electronic device of claim 15, wherein the sub-band processing is configured to increase a signal-to-noise ratio of one or more of the samples of the wireless signals.

18. The electronic device of claim 15, wherein the interface circuit is configured to determine a distance between the electronic device and the second electronic device based at least in part on the samples of the wireless signals and the estimated time of arrival.

19. The electronic device of claim 15, wherein the super-resolution technique comprises one of: a multiple signal classification (MUSIC) technique or a linear-prediction super-resolution technique.

20. The electronic device of claim 15, wherein the samples of the wireless signals comprise one or more of: time samples, or frequency samples.

* * * * *